(12) United States Patent
Schmitt et al.

(10) Patent No.: US 12,441,859 B2
(45) Date of Patent: Oct. 14, 2025

(54) STRAIN HARDENED POLYPROPYLENE COPOLYMER COMPOSITIONS

(71) Applicant: ExxonMobil Chemical Patents Inc., Baytown, TX (US)

(72) Inventors: Sasha P. Schmitt, Houston, TX (US); George J. Pehlert, Houston, TX (US); Stefan B. Ohlsson, Keerbergen (BE); Willy J.J. Leysen, Sao Paulo (BR)

(73) Assignee: ExxonMobil Chemical Patents Inc., Baytown, TX (US)

( * ) Notice: Subject to any disclaimer, the term of this patent is extended or adjusted under 35 U.S.C. 154(b) by 1037 days.

(21) Appl. No.: 17/276,191

(22) PCT Filed: Sep. 6, 2019

(86) PCT No.: PCT/US2019/049879
§ 371 (c)(1),
(2) Date: Mar. 15, 2021

(87) PCT Pub. No.: WO2020/068393
PCT Pub. Date: Apr. 2, 2020

(65) Prior Publication Data
US 2022/0025143 A1 Jan. 27, 2022

Related U.S. Application Data

(60) Provisional application No. 62/736,645, filed on Sep. 26, 2018.

(30) Foreign Application Priority Data

Oct. 10, 2018 (EP) .................................... 18199601

(51) Int. Cl.
C08J 9/04 (2006.01)
C08F 210/06 (2006.01)
C08K 5/14 (2006.01)

(52) U.S. Cl.
CPC ............... *C08J 9/04* (2013.01); *C08F 210/06* (2013.01); *C08K 5/14* (2013.01); *C08J 2323/14* (2013.01)

(58) Field of Classification Search
CPC .................... C08K 5/14; C08F 2500/03; C08J 2323/10–16
See application file for complete search history.

(56) References Cited

U.S. PATENT DOCUMENTS

| | | |
|---|---|---|
| 5,047,485 A | 9/1991 | DeNicola, Jr. |
| 5,416,169 A | 5/1995 | Saito et al. |
| 5,883,151 A | 3/1999 | Raetzsch et al. |
| 6,323,289 B1 | 11/2001 | Hogt et al. |
| 6,350,828 B1 | 2/2002 | Takaoka et al. |
| 6,573,343 B1 | 6/2003 | Follestad |
| 6,875,826 B1 | 4/2005 | Huovinen et al. |
| 6,956,067 B2 | 10/2005 | Sasaki et al. |
| 8,153,745 B2 | 4/2012 | Ernst et al. |
| 9,068,030 B2 | 6/2015 | Song et al. |
| 9,200,095 B2 | 12/2015 | Tran et al. |
| 9,453,093 B2 | 9/2016 | Meka et al. |
| 9,505,906 B1 | 11/2016 | Tippet et al. |
| 10,301,441 B2 | 5/2019 | Frijlink et al. |
| 10,457,789 B2 | 10/2019 | Zhao et al. |
| 10,538,645 B2 | 1/2020 | Pehlert et al. |
| 2002/0043643 A1* | 4/2002 | Korehisa ................ C08F 8/00 252/71 |
| 2003/0157286 A1 | 8/2003 | Hesse et al. |
| 2009/0247656 A1* | 10/2009 | Jacob .................... A43B 13/04 521/96 |
| 2012/0245302 A1 | 9/2012 | Nakajima et al. |

(Continued)

FOREIGN PATENT DOCUMENTS

| | | |
|---|---|---|
| EP | 2 000 504 A1 | 12/2008 |
| EP | 2 679 630 A1 | 1/2014 |

(Continued)

OTHER PUBLICATIONS

Muke et al. Extensional rheology of polypropylene melts from the Rheotens test. J. Non-Newtonian Fluid Mech. 2001, 101, 77-93. (Year: 2001).*

(Continued)

*Primary Examiner* — Stephen E Rieth
(74) *Attorney, Agent, or Firm* — Vorys, Sater, Seymour and Pease LLP

(57) ABSTRACT

The present disclosure relates to compositions including copolymers, and methods for making compositions. In an embodiment, a composition includes the product of a copolymer comprising at least 50 mol % propylene and at least 1 wt % of at least one of ethylene or a $C_4$ to $C_{10}$ α-olefin, based on the total weight of the copolymer; and an organic peroxide. The copolymer has $Mw_{MALLS}/Mn_{MALLS}$ of from 1 to 5. In an embodiment, a process to form a composition includes introducing a copolymer with an organic peroxide, the copolymer comprising at least 50 mol % propylene and at least 1 wt % of at least one of ethylene or a $C_4$ to $C_{10}$ α-olefin, based on the total weight of the copolymer; and obtaining a composition comprising a product of the copolymer and the organic peroxide. The copolymer has $Mw_{MALLS}/Mn_{MALLS}$ of from 1 to 5.

21 Claims, 10 Drawing Sheets

(56) References Cited

U.S. PATENT DOCUMENTS

| | | | |
|---|---|---|---|
| 2015/0004394 A1* | 1/2015 | Hotta | B29C 48/21 |
| | | | 525/88 |
| 2017/0181498 A1* | 6/2017 | Whelan | C08J 9/08 |
| 2017/0210859 A1 | 7/2017 | Pehlert et al. | |
| 2018/0016414 A1 | 1/2018 | Pehlert et al. | |
| 2018/0051160 A1 | 2/2018 | Pehlert et al. | |
| 2018/0094089 A1 | 4/2018 | Kalfus et al. | |
| 2018/0208753 A1* | 7/2018 | Lau | B29B 7/88 |
| 2018/0371224 A1* | 12/2018 | Degenhart | C08J 9/141 |
| 2020/0223956 A1* | 7/2020 | Frijlink | C08K 5/14 |
| 2020/0325318 A1 | 10/2020 | Allen, Jr. et al. | |

FOREIGN PATENT DOCUMENTS

| | | | |
|---|---|---|---|
| WO | 1994/005707 A1 | 3/1994 | |
| WO | 00/00520 A1 | 1/2000 | |
| WO | WO-2016164111 A1 * | 10/2016 | C08J 3/203 |

OTHER PUBLICATIONS

M.H. Wagner et al., "The strain-hardening behaviour of linear and long-chain-branched polyolefin melts in extensional flows," in 39 Rheol. Acta 97-109 (2000).

R.P. Lagendijk et al., in "Peroxydicarbonate modification of polypropylene and extensional flow properties," in 42 Polymer 10035-10043 (2001).

P. Spitael et al., in "Strain hardening in polypropylenes and its role in extrusion foaming," in 44(11) Poly. Eng. & Sci. 2090-2100 (2004).

K. Jayaraman et al., "Entangling additives enhance polypropylene foam quality," in SPE Plastics Research Online (2011).

P. Iacobucci, "High melt strength polypropylene through reactive extrusion with Perkadox 24L," SPE Polyolefins Conference, Houston, TX (Feb. 2004).

H. Pol et al., "Microstructure and rheology of high-melt-strength poly-(propylene) impact copolymer," in SPE Plastics Research Online (2014).

M. Ratzsch et al., 27 Prog. Polym. Sci. 27 1195 (2002).

N. Spisakova et al., in 15 J. Macrm. Sci. & App. Chem. 37 (2000).

* cited by examiner

STRAIN HARDENED POLYPROPYLENE COPOLYMER COMPOSITIONS

CROSS-REFERENCE TO RELATED APPLICATIONS

This application is a National Phase application claiming priority to PCT application Serial No. PCT/US2019/049879, filed Sep. 6, 2019, which claims priority to U.S. Provisional Application No. 62/736,645, filed Sep. 26, 2018, and European Patent Application No. 18199601.8 which was filed Oct. 10, 2018, the disclosures of which are incorporated herein by reference.

FIELD

The present disclosure relates to compositions including copolymers, and methods for making compositions.

BACKGROUND

Current global rising demand for high quality thermoplastic polymers in both household and industrial applications prompt the development of new polymer compositions with tailored properties, such as high melt strength and high extensional strain hardening.

Common linear polyolefins (e.g., polypropylene) grades widely used for manufacturing display low melt strength and lack strain hardening behavior under extensional flow needed for foaming, and copolymers used in applications requiring toughness, softness, and elasticity. Some applications, in particular those requiring melt strength and strain hardening like foam, could benefit from a polymer that also could provide elasticity and toughness for some applications.

The applicability of polypropylenes in industrial operations that involve both shear and extensional flows, including thermoforming, fiber drawing/spinning, blown film, and foam has been limited. This is partially due to its low melt strength and lack of strain hardening in common linear polypropylene. Multiple approaches have been attempted in the industry to improve the melt strength and strain hardening of polypropylenes including increasing the polymer molecular weight, broadening of the molecular weight distribution, and/or addition of an ultra-high molecular weight tail.

The lack of strain hardening leads to lower viscosity cell walls during bubble expansion in the foaming process, coalescence of bubbles, and the formation of open-cell foams. Previous efforts to modify linear polypropylene by introduction of long chain branching through reactive extrusion with organic peroxides such as peroxydicarbonates resulted in increased strain hardening, but the level of strain hardening alone was not sufficient to produce closed-cell foams.

Hence, there is a need for polymer compositions having high melt strength and strain hardening to form commercially viable foamed articles, such as foamed food containers.

Related publications include U.S. Pat. No. 6,323,289; US 2018/0016414; US 2018/0051160; US 2018/0016414; U.S. Pat. Nos. 5,047,485; 5,416,169; 5,883,151; 6,956,067; 6,875,826 A1; U.S. Pat. Nos. 6,573,343; 6,350,828; 6,323,289; 8,153,745; 9,068,030; 9,200,095; US 2002/0043643; US 2003/0157286 A1; US 2012/245302; EP 1179544; EP 2679630 A1; EP 2000504 A1; WO 1994/005707 A1; WO 00/00520; WO 2014/070386; WO 2015/200586; WO 2016/175942; and WO 2019/013872; and M. H. Wagner et al., "The strain-hardening behaviour of linear and long-chain-branched polyolefin melts in extensional flows," in 39 RHEOL. ACTA 97-109 (2000); R. P. Lagendijk et al., in "Peroxydicarbonate modification of polypropylene and extensional flow properties," in 42 POLYMER 10035-10043 (2001); P. Spitael et al., in "Strain hardening in polypropylenes and its role in extrusion foaming," in 44(11) POLY. ENG. & SCI. 2090-2100 (2004); K. Jayaraman et al., "Entangling additives enhance polypropylene foam quality," in SPE PLASTICS RESEARCH ONLINE (2011); P. Iacobucci, "High melt strength polypropylene through reactive extrusion with Perkadox 24L," SPE POLYOLEFINS CONFERENCE, Houston, TX (February 2004); H. Pol et al., "Microstructure and rheology of high-melt-strength poly-(propylene) impact copolymer," in SPE PLASTICS RESEARCH ONLINE (2014); M. Ratzsch et al., 27 PROG. POLYM. SCI. 27 1195 (2002); and N. Spisakova et al., in 15 J. MACRM. SCI. & APP. CHEM. 37 (2000).

SUMMARY

The present disclosure relates to compositions including copolymers, and methods for making compositions. In an embodiment, a composition includes the product of a copolymer comprising at least 50 mol % propylene and at least 1 wt % of at least one of ethylene or a $C_4$ to $C_{10}$ α-olefin, based on the total weight of the copolymer; and an organic peroxide. The copolymer has $Mw_{MALLS}/Mn_{MALLS}$ of from 1 to 5. In an embodiment, a process to form a composition includes introducing a copolymer with an organic peroxide, the copolymer comprising at least 50 mol % propylene and at least 1 wt % of at least one of ethylene or a $C_4$ to $C_{10}$ α-olefin, based on the total weight of the copolymer; and obtaining a composition comprising a product of the copolymer and the organic peroxide. The copolymer has $Mw_{MALLS}/Mn_{MALLS}$ of from 1 to 5.

DETAILED DESCRIPTION

Figure 1:
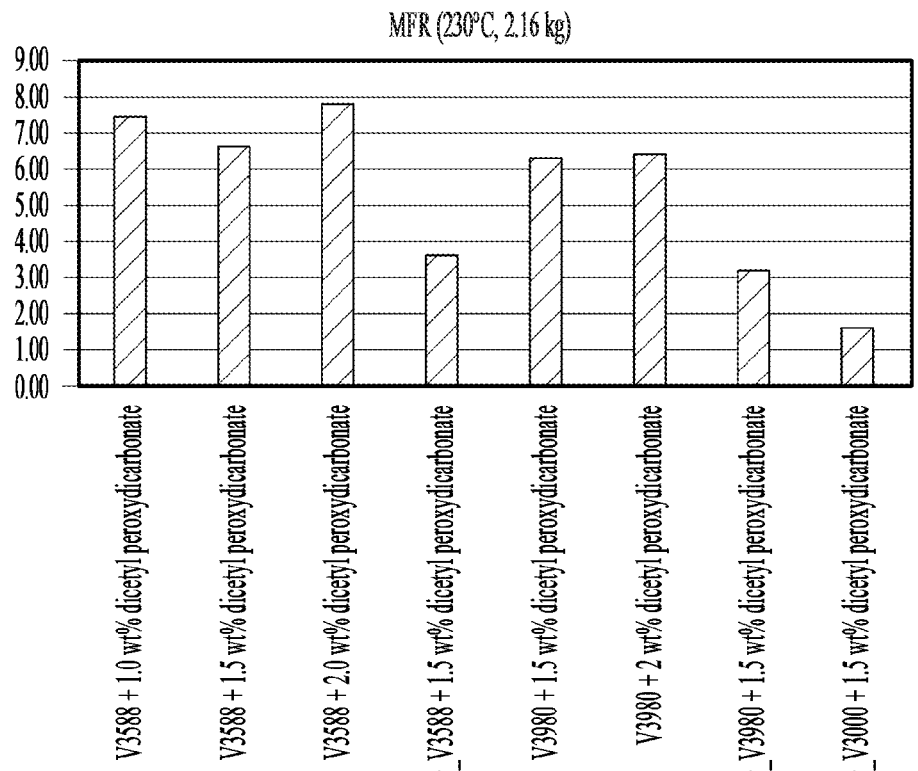
FIG. 1 is a graph illustrating Melt Flow Rate (MFR) data of compositions, according to any embodiment.

The present disclosure relates to compositions including copolymers, and methods for making compositions. The present disclosure further relates to improved methods of solid state blending and post reactor reactions for copolymer compositions having improved properties such as melt strength or extensional strain hardening (as compared to linear polypropylenes), without substantial loss in mechanical properties, making the compositions suitable for foamed articles.

The present disclosure relates to compositions including copolymers, such as ethylene-propylene copolymers, that have been treated with a peroxide. For example, disclosed herein are copolymer compositions with a high molecular weight fraction (i.e. high molecular weight tail) modified by introduction of long chain branching through reactive extrusion with an organic peroxide. Treatment of a low temperature decomposition peroxide, such as a peroxydicarbonate, and a granular or pellet form of, for example, an ethylene-propylene elastomeric copolymer, such as a Vistamaxx™ polymer (from ExxonMobil Chemical Company), can provide melt strength improvement and extensional strain hardening enhancement. Copolymers of the present disclosure can be treated with an organic peroxide to form a copolymer composition having a Peak Extensional Viscosity of $1 \times 10^3$ Pa·s to $1 \times 10^6$ Pa·s, (which is indicative of long chain branching), and an increased weight average molecular weight, thus giving the copolymer composition exceptional strain hardening elongational viscosity. Without being bound by theory, an increase of crosslinking appears to be due to the presence of ethylene in the backbone of the copolymer.

Compositions of the present disclosure can include the product of one or more copolymers, such as copolymers, and from 0.01 wt % to 3 wt % of at least one peroxide, such as an organic peroxide, based on the weight of the copolymer and an organic peroxide. A copolymer composition can further include an alkyl radical scavenger, such as a tocopherol, lactone, hydroxyl amine, and/or one or more additives such as stabilizers, acid scavengers, and/or nucleating agents.

A copolymer composition of the present disclosure can have one or more of: a melt flow rate (MFR, ASTM D1238, Condition L, 230° C. and 2.16 kg) of from 1 g/10 min to 10 g/10 min, an ethylene content of 1 wt % to 50 wt %, a melt strength of 1 cN to 15 cN, a Peak Extensional Viscosity of $1 \times 10^3$ Pa·s to $1 \times 10^6$ Pa·s, a complex viscosity of 100 Pa·s to 100,000 Pa·s, an Mn value of 50,000 g/mol to 140,000 g/mol, an Mw of from 100,000 g/mol to 300,000 g/mol, an Mz of from 200,000 g/mol to 850,000 g/mol, an $Mv_{MALLS}$ of from 100,000 g/mol to 300,000 g/mol, molecular weight distribution ($Mw_{DRI}/Mn_{DRI}$) of from 1 to 2.5 (narrow PDI), an intrinsic viscosity [η] value of 1 dL/g to 1.6 dL/g, a branching index g'vis of 0.7 to 1, and an $Mz_{MALLS}/Mw_{MALLS}$ of from 1 to 3.

Also disclosed is a process including combining polyolefin granules and/or pellets having a melt flow rate, e.g., an MFR1, wherein the temperature of the polyolefin granules and/or pellets is maintained at least at room temperature (e.g., 23° C.+/−5° C.); conveying the polyolefin granules to a homogenizer while maintaining the temperature of the granules and/or pellets at a temperature of at least room temperature; and mixing the polyolefin granules and/or pellets with an organic peroxide in the homogenizer for a residence time of 30 seconds or greater, such as from 30 seconds to 180 seconds, at a temperature below the melting point temperature of the polyolefin granules and/or pellets to form a polyolefin product having a melt flow rate, e.g., an MFR2, such as MFR1 is greater than MFR2. Residence time is the time between the addition of the solid peroxide into the homogenizer and the kneading section of the extruder when it is estimated that temperature rise is rapid and peroxide decomposition has occurred.

As used herein, a "composition" can include the components (such as a copolymer) as well as contact products of the components and/or reaction products of the components.

For the purposes of the present disclosure, ethylene shall be considered an α-olefin.

Unless otherwise noted all melting points (Tm) are DSC second melt.

The following abbreviations may be used herein: Mn is number average molecular weight, Mw is weight average molecular weight Mz is z average molecular weight, Mv is viscosity average molecular weight. Unless otherwise specified, references to Mn, Mw, Mz, and Mv are determined by DRI as described herein. The symbol "wt %" is weight percent, mol % is mole percent, MWD is molecular weight distribution, PDI is polydispersity index, MFR is melt flow rate, MAO is methylalumoxane, RT is room temperature, and DRI is differential refractive index detector. LS refers to light scattering and MALLS refers to multi-angle light scattering. LS and MALLS are used herein interchangeably.

A "polymer" has two or more of the same or different monomer ("mer") units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers.

As used herein, "mixing" refers to combining solid polyolefin such as ethylene-propylene copolymer(s) and organic peroxide, which may be solid. In at least any embodiment, a homogenizer is used for such mixing. "Homogenizers" are mechanical devices that combine two or more distinct materials, such as one or all in solid form, by physical methods such as mixing, spinning, agitation, vibration, or some combination thereof. Suitable homogenizers can be generally divided between horizontal conveyors, in which a screw or screw-like mechanism conveys polymer granules and/or pellets and additive mixtures down the length of the homogenizer, and vertical or horizontal blenders which homogenizes polymer granules and/or pellets and additive mixtures by agitation or some other non-conveying means. In at least any embodiment, the homogenizer maintains the materials being mixed in solid and/or liquid form and does not create a molten material such as by heating a polymer to its melting point temperature.

Thus, in at least any embodiment, the present disclosure describes a process including combining polyolefin granules and/or pellets having an MFR1, wherein the temperature of the polyolefin granules and/or pellets is maintained at least at room temperature; conveying the polyolefin granules to a homogenizer while maintaining the temperature of the granules and/or pellets; and mixing the polyolefin granules and/or pellets with an organic peroxide in the homogenizer for a residence time of at least 30 seconds, such as 50 seconds, such as 60 seconds, such as 70 seconds, such as from 30 seconds to 180 seconds, at a temperature below the melting point temperature of the polyolefin granules and/or pellets to form a copolymer composition having an MFR2, such as MFR1 is greater than MFR2, at a temperature below the melting point temperature of the polyolefin granules, such as at room temperature or greater, such as a range from 45° C. to 80° C. (176° F.), such as from room temperature to 71° C. (160° F.), for example 59° C. The copolymer composition can have a Peak Extensional Viscosity of $1 \times 10^3$ Pa·s to $1 \times 10^6$ Pa·s.

The term "polypropylene" ("PP") refers to polymers or mixtures of polymers containing at least 50% by weight of polymerized propylene. Polymerization catalysts may be Ziegler-Natta, metallocene or other types of catalysts which may give stereospecific polymerization of propylene. Use may be made in this connection of homopolymers of propylene; random, alternating, or block copolymers; or random, alternating, or block terpolymers of propylene and another olefin. Generally, a propylene copolymer or terpolymer will contain one or more other olefins, such as ethylene, butene, pentene, hexene, heptene, or octene, but it may also include other olefinically unsaturated monomers or combinations of these, such as acrylates, styrene, styrene derivatives, acrylonitrile, vinyl acetate, vinylidene chloride, and vinyl chloride. In at least any embodiment, the polyolefin polymer used for the preparation of the copolymer composition is a copolymer.

"Linear" means that the polymer has few, if any, long chain branches and has a g'vis value of 1. The more branching, the lower g'vis. Hence, g'vis can be 0.98 or less, such as 0.97 or less, such as 0.96 or less.

As used herein, "elastomer" or "elastomer composition" refers to any polymer or composition of polymers (such as blends of polymers) consistent with the ASTM D1566 definition. Elastomer includes mixed blends of polymers such as melt mixing and/or reactor blends of polymers. An elastomer is an elastic polymer, such as a polymer with viscoelasticity (both viscosity and elasticity).

As used herein, "shear thinning" describes fluids which have decreased viscosity when subjected to shear strain; thus, polymers that exhibit "shear thinning" have improved processability in that when exposed to extruder conditions of shear stress, the polymers are more easily processed. An ARES-G2B (TA Instruments) rheometer can be used to measure shear thinning of polymer samples.

As used herein, "strain hardening" is the strengthening of a polymer when exposed to forces of deformation. An Anton-Paar MCR 501 mechanical spectrometer was used to measure strain hardening of the polypropylene samples.

As used herein, "melt strength" refers to the resistance of a polymer melt to stretching. Without being bound by theory, it is believed that the melt strength of a material is related to the molecular chain entanglements of the polymer and its resistance to untangling under strain. The polymer properties affecting the resistance to untangling are molecular weight, molecular-weight distribution (MWD) and molecular branching. It is determined herein determined using an extensional rheometer at 190° C.

The "melt flow rate" (MFR) is measured in accordance with ASTM D1238 at 230° C. and 2.16 kg load.

The "Peak Extensional Viscosity" or "PEV" is the difference between the highest value for the extensional viscosity (y-axis in FIGS. 3-8) and the linear viscoelastic limit "LVE". Copolymer compositions of the present disclosure can have improved strain hardening as evidenced by increased Peak Extensional Viscosity, as shown in FIGS. 3-8.

Copolymers

In at least any embodiment, the copolymer is a random copolymer having ethylene or $C_4$ to $C_{10}$ α-olefin derived units and optionally diene-derived units, the remainder of the polymer being propylene-derived units. The copolymer contains at least 50 wt % propylene-derived units by weight of the copolymer.

The copolymer contains greater than 50 wt %, such as greater than 60 wt %, such as greater than 65 wt %, such as greater than 75 wt % and up to 99 wt % propylene-derived units, based on the total weight of the copolymer. In at least any embodiment, the copolymer includes propylene-derived units in an amount based on the weight of the copolymer of from 75 wt % to 95 wt %, such as 75 wt % to 92.5 wt %, such as 82.5 wt % to 92.5 wt %, such as 82.5 wt % to 90 wt %. Correspondingly, the units, or comonomers, derived from at least one of ethylene or a $C_4$ to $C_{10}$ α-olefin may be present in an amount of 1 wt %, 5 wt %, or 10 wt %, or 14 wt % to 16 wt %, 18 wt %, 22 wt %, or 25 wt % by weight of the copolymer.

The comonomer content may be adjusted so that the copolymer has a heat of fusion of 100 J/g or less, such as 75 J/g or less, a melting point (Tm) of 100° C. or less, such as 90° C. or less, and crystallinity of 2% to 65% of isotactic polypropylene, and an MFR, as measured at 230° C. and 2.16 kg weight, of less than 800 g/10 min.

The copolymer may include more than one comonomer. In at least any embodiment, a copolymer has more than one comonomer including propylene-ethylene-octene, propylene-ethylene-hexene, and propylene-ethylene-butene copolymers.

In embodiments where more than one comonomers derived from at least one of ethylene or a $C_4$ to $C_{10}$ α-olefins are present, the amount of each comonomer may be less than 5 wt % of the copolymer, but the combined amount of comonomers by weight of the copolymer is 5 wt % or greater.

In at least any embodiment, the comonomer is ethylene, 1-hexene, or 1-octene, such as in an amount of 5 wt %, or 10 wt %, or 14 wt % to 16 wt %, 18 wt %, 22 wt %, or 25 wt % based on the weight of the copolymer.

In at least any embodiment, the copolymer includes ethylene-derived units. The copolymer may include 5 wt %, or 10 wt %, or 14 wt % to 16 wt %, 18 wt %, 22 wt %, or 25 wt % of ethylene-derived units by weight of the copolymer. In at least any embodiment, the copolymer consists essentially of units derived from propylene and ethylene, i.e., the copolymer does not include any other comonomer in an amount present as impurities in the ethylene and/or propylene feedstreams used during polymerization or an amount that would materially affect the heat of fusion, melting point, crystallinity, or melt flow rate of the copolymer, or any other comonomer intentionally added to the polymerization process.

In at least any embodiment, diene comonomer units are included in the copolymer. Examples of the diene include, but not limited to, dicyclopentadiene, 1,3-cyclopentadiene, divinylbenzene, 1,4-hexadiene, 1,4-cyclohexadiene, 1,5-hexadiene, 5-methyl-1,4-hexadiene, 1,6-octadiene, 1,7-octadiene, 3,7-dimethyl-1,6-octadiene, 1,9-decadiene, 1,11-dodecadiene, 1,13-tetradecadiene, 5-methylene-2-norbornene, 5-ethylidene-2-norbornene, 5-vinyl-2-norbornene, or a combination thereof. The amount of diene comonomer is equal to or more than 0.01 wt %, or 0.5 wt %, or 1 wt %, or 1.5 wt % and lower than, or equal to, 5 wt %, or 4 wt %, or 3 wt % or 2 wt % based on the weight of copolymer.

The copolymer can have a heat of fusion ("$H_f$"), as determined by the Differential Scanning calorimetry ("DSC"), of 100 J/g or less, such as 75 J/g or less, such as 70 J/g or less, such as 50 J/g or less, such as 35 J/g or less. The copolymer may have a lower limit $H_f$ of 0.5 J/g, 1 J/g, or 5 J/g. For example, the $H_f$ value may be anywhere from 1 J/g to 75 J/g, such as 1.5 J/g to 70 J/g, such as 3 to 60 J/g, such as 4 J/g to 50 J/g, such as 6 J/g to 40 J/g, such as 7 J/g to 30 J/g.

The copolymer may have a percent crystallinity, as determined according to DSC procedure, of 2% to 65%, such as 0.5% to 40%, such as 1% to 30%, such as 5% to 35%, of isotactic polypropylene. The thermal energy for the highest order of propylene (i.e., 100% crystallinity) is estimated at 189 J/g. In at least any embodiment, the copolymer has a crystallinity in the range of 0.25% to 25%, such as of 0.5% to 22% of isotactic polypropylene.

The crystallization and melting point temperatures of copolymers and compositions of the present disclosure can be determined by Differential Scanning calorimetry at 10° C./min on a Pyris™ 1 DSC. The DSC ramp rate is 10° C./min for both heating and cooling. The measurements are taken as follows: 1) Hold for 10.0 min at −20.0° C.; 2) Heat from −20.0° C. to 200.0° C. at 10.0° C./min; 3) Hold for 10.0 min at 200.0° C.; 4) Cool from 200.0° C. to −20.0° C. at 10.0° C./min; 5) Hold for 10.0 min at −20.0° C.; and 6) Heat from −20.0° C. to 200.0° C. at 10.0° C./min.

In at least any embodiment, the propylene-derived units of the copolymer have an isotactic triad fraction of 50% to 99%, such as 65% to 97%, such as 75% to 97%. For example, the first polymer may have a triad tacticity as measured by $^{13}C$ NMR, of 75% or greater, such as of 80% or greater, such as of 82% or greater, such as of 85% or greater, such as of 90% or greater. The triad tacticity of a polymer is the relative tacticity of a sequence of three adjacent propylene units, a chain consisting of head to tail bonds, expressed as a binary combination of m and r sequences. It is usually expressed as the ratio of the number of units of the specified tacticity to all of the propylene triads in the first polymer. The triad tacticity (mm fraction) of a propylene copolymer can be determined from a $^{13}C$ NMR spectrum of the propylene copolymer. The calculation of the triad tacticity is described in the U.S. Pat. No. 5,504,172, the entire contents of which are incorporated herein by reference.

The copolymer may have a single peak melting transition as determined by DSC. In at least any embodiment, the copolymer has a primary peak transition of 90° C. or less, with a broad end-of-melt transition of 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the $T_m$ of the copolymer. The copolymer may have a $T_m$ of 100° C. or less, such as 90° C. or less, such as 80° C. or less, such as 70° C. or less. In at least any embodiment, the copolymer has a $T_m$ of 25° C. to 100° C., such as 25° C. to 85° C., such as 25° C. to 75° C., such as 25° C. to 65° C. In at least any embodiment, the copolymer has a $T_m$ of 30° C. to 80° C., such as 30° C. to 70° C.

In at least any embodiment, the copolymer has a Mooney viscosity [ML (1+4) at 125° C.], as determined according to ASTM D-1646, of less than 100, such as less than 75, such as less than 60, such as less than 30.

The copolymer may have a density of 0.850 g/cm$^3$ to 0.920 g/cm$^3$, such as 0.860 g/cm$^3$ to 0.900 g/cm$^3$, such as 0.860 g/cm$^3$ to 0.890 g/cm$^3$, at room temperature as measured per ASTM D-1505.

Suitable copolymers may have a weight average molecular weight ("Mw") of 5,000 to 5,000,000 g/mole, such as 10,000 g/mole to 1,000,000 g/mole, such as 50,000 g/mole to 400,000 g/mole; a number average molecular weight ("Mn") of 2,500 g/mole to 2,500,00 g/mole, such as 10,000 g/mole to 250,000 g/mole, such as 25,000 g/mole to 200,000 g/mole; and/or a z-average molecular weight ("Mz") of 10,000 g/mole to 7,000,000 g/mole, such as 80,000 to 700,000 g/mole, such as 100,000 g/mole to 500,000 g/mole. The copolymer may have a molecular weight distribution (Mw/Mn, or "MWD") of 1.5 to 20, or 1.5 to 15, such as 1.5 to 5, such as 1.8 to 5, such as 1.8 to 4.

The copolymer may have an Elongation at Break of from 200% to 2000%, such as from 500% to 1000%, such as from 800% to 900%, as measured per ASTM D412.

A copolymer may have crystalline regions interrupted by non-crystalline regions and within the range from 5 wt % to 25 wt %, by weight of the copolymer. Not intended to be limited by any theory, it is believed that the non-crystalline regions may result from regions of non-crystallizable polypropylene segments and/or the inclusion of comonomer units. The crystallinity and the melting point of the copolymer, which may be a propylene-based elastomer, are reduced compared to highly isotactic polypropylene by the introduction of errors (stereo and regio defects) in the insertion of propylene and/or by the presence of comonomer. In at least any embodiment, the copolymer is a copolymer having limited crystallinity due to adjacent isotactic propylene units. In other embodiments, the copolymer is generally devoid of any substantial intermolecular heterogeneity in tacticity and comonomer composition, and also generally devoid of any substantial heterogeneity in intramolecular composition distribution.

Commercial examples of copolymers of the present disclosure can include Vistamaxx™ propylene-based elastomers which are propylene-ethylene copolymers from ExxonMobil Chemical Company, Tafmer™ elastomers from Mitsui Chemicals, and Versify™ elastomers from Dow Chemical Company.

For example, Vistamaxx™ propylene-based elastomer is a polymer that extends the performance and processability of films, compounds, nonwovens and molded/extruded products. The free flowing pellets of Vistamaxx™ propylene-based elastomer are easy to incorporate and the broad compatibility allows dry blending operations. Vistamaxx™ propylene-based elastomer offers a range of applications such as, for example, 1) nonwovens (elasticity, softness and toughness; delivered with drop-in processing performance); 2) films (elasticity, sealability, toughness and tack); 3) polymer modification and compounds (impact strength, transparency, flexibility/stiffness, softness, high filler loading). Vistamaxx™ copolymers are copolymers of propylene and ethylene. Vistamaxx™ propylene-based elastomer are propylene rich (>80%) and are semi-crystalline materials with high amorphous content.

Vistamaxx™ 3000 propylene-ethylene performance polymer ("VM3000") is available from ExxonMobil Chemical Company. VM3000 has an ethylene content of 11 wt % with the balance being propylene. Properties of VM3000 include: a density of 0.873 g/cm$^3$ (ASTM D1505); a melt index of 3.7 g/10 min (ASTM D1238; 190° C., 2.16 kg); a melt mass flow rate of 8 g/10 min (230° C., 2.16 kg); a Shore D hardness of 27 (ASTM D2240); and a Vicat softening temperature (VST) of 65.1° C.

Vistamaxx™ 3588 propylene-based elastomer ("VM3588") is available from ExxonMobil Chemical Company. VM3588 has an ethylene content of 4 wt % with the balance being propylene. Properties of VM3588 include: a density of 0.889 g/cm$^3$ (ASTM D1505); a melt mass flow rate of 8 g/10 min (230° C., 2.16 kg); a Shore D hardness of 50 (ASTM D2240); and a Vicat softening temperature (VST) of 103° C.

Vistamaxx™ 3980 propylene-based elastomer ("VM3980") is available from ExxonMobil Chemical Company. VM3020 has an ethylene content of 9 wt % with the balance being propylene. Properties of VM3980 include: a density of 0.879 g/cm$^3$ (ASTM D1505); a melt index of 3.6 g/10 min (ASTM D1238; 190° C., 2.16 kg); a melt mass flow rate of 8 g/10 min (230° C., 2.16 kg); a Shore D hardness of 34 (ASTM D2240); and a Vicat softening temperature (VST) of 77.3° C.

Examples of suitable means of polymerization to form copolymers of the present disclosure include contacting a catalyst and olefins in a gas phase reactor, stirred tank reactor, loop reactor, or other reactors. The polymerization may take place in the gas phase, as a solution, or as a slurry. Hydrogen may be present in the reactor to modulate the molecular weight of the copolymer being produced. In at least any embodiment, the hydrogen, if combined with the single catalyst during the polymerization, is combined at a constant level. This means that the total concentration of hydrogen in the reactor is held constant during the production of the copolymer.

In at least any embodiment, the polymerization is a "single stage" polymerization process, meaning that the olefins and catalyst, and optional hydrogen are contacted under the same or similar conditions throughout the production of the copolymer granules, such as in a single reactor, or multiple reactors in parallel or series, held at a constant level of temperature, pressure, monomer concentration, and hydrogen concentration, where no parameter changes by more than ±5%, or ±10%. Thus, for example, a polymerization is single stage even if performed in two or more loop slurry reactors in parallel if the reactor conditions are held at a constant level.

The phrases "slurry polymerization process" or "slurry polymerization reactor" refer to a process or reactor that handles polymer that is only partly dissolved or not dissolved at all in the medium, either monomer, solvent, or both, such as having at least 20 wt % polymer, by weight of the polymer, monomers and diluent, suspended or not dissolved. In a suitable solution or slurry polymerization process, catalyst components, solvent, monomers and hydrogen (when used) are passed under pressure to one or more polymerization reactors. Catalyst components may be passed to the polymerization reactor as a mixture in aliphatic hydrocarbon solvent, in oil, a mixture thereof, or as a dry powder. In at least any embodiment, the polymerization process is carried out using ethylene/propylene as the only solvent (a bulk polymerization).

In any case, the temperature of the reactor is controlled by the rate of catalyst addition (rate of polymerization), the temperature of the solvent/monomer feed stream and/or the use of heat transfer systems. For olefin polymerization, reactor temperatures can range from 50° C. to 120° C. or more, while pressures are generally higher than 300 psig, or within a range from 300 psig to 1000 psig, or 1200 psig. These process conditions favor in-situ catalyst activation since high temperature enhances the solubility of catalysts and activators in aliphatic hydrocarbon solvent. In at least any embodiment, the polymerization temperature, that is, the temperature at which the polymerization reaction is conducted such as the environment of a polymerization vessel or reactor, is at least 50° C., such as at least 60° C., such as at least 70° C., or within a range from 50° C. to 170° C., such as from 60° C. to 160° C., such as from 70° C. to 150° C., such as from 80° C. to 140° C., such as from 90° C. to 130° C., such as from 100° C. to 120° C. The vessel or reactor can be a loop reactor, or stirred tank reactor, a gas phase reactor, or any other suitable reactor.

The propylene, ethylene, and, if present, other $C_4$ to $C_{12}$ α-olefin and/or diene, are dissolved/dispersed in the solvent either prior to being passed to the polymerization reactor (or for gaseous monomers, the monomer may be passed to the reactor so that it will dissolve in the reaction mixture). Prior to mixing, the solvent and monomers are generally purified to remove potential catalyst poisons. The feedstock may be heated or cooled prior to delivery to the first reactor. Additional monomers and solvent may be added to the second reactor, and it may be heated or cooled.

The catalysts/activators can be passed to one polymerization reactor or split between two or more reactors. In solution or slurry polymerization, polymer produced can be molten and remains dissolved or partially dissolved in the solvent under reactor conditions, forming a polymer solution. The catalyst may be passed to the reactor in solid form or as a slurry/suspension in a solvent. Alternatively, the catalyst suspension may be premixed with the solvent in the feed stream for the polymerization reaction. Catalyst can be activated in-line, or by an activator with which it is co-supported. In some instances premixing is desirable to provide some reaction time prior to the catalyst components entering the polymerization reactor, which may be in the presence or absence of the monomer to effect what is known as "pre-polymerization," but this step can be absent. The catalyst activity may be 40,000 kg polymer per kg of catalyst or more, such as 400,000 kg polymer per kg of catalyst or more, such as 1,000,000 kg polymer per kg of catalyst or more.

In at least any embodiment, the solution or slurry polymerization processes of this disclosure include a stirred reactor system including one or more stirred polymerization reactors. Generally, the reactors should be operated under conditions to achieve a thorough mixing of the reactants. In a dual reactor system, the reactors may operate at the same or different temperatures and fluidly connected in series, but can operate at the same temperature or within ±2° C., or ±4° C. of one another as measured by an internal thermocouple within the polymerization medium or inside wall of each reactor, consistent with one another. The residence time in each reactor will depend on the design and the capacity of the reactor. In at least any embodiment, the two or more reactors otherwise operate under the same conditions.

In at least any embodiment, the solution or slurry polymerization process is carried out in one or more loop-type of reactors, such as two fluidly connected in series. Such reactor systems include a single reactor and multiple reactors in series or parallel configuration, such as that disclosed in US 2007/0022768. The solvent/monomer, such as simply propylene, flow in these reactors may be maintained using pumps and/or pressure systems, and may operate continuously by having monomer and catalyst feed at one point and extracting the forming polymer from another point, such as downstream therefrom. The conditions of temperature, catalyst concentration, hydrogen concentration, and monomer concentration may be the same or different in each loop reactor and may be tailored as necessary to suit the desired end product.

In at least any embodiment, the solution polymerization process of this disclosure uses heat exchanger types of reactors where the polymerization. The reactors can be one or more shell and tube type of heat exchangers, or one or more spiral type of heat exchanger.

In any case, the copolymer formed is then discharged from the reactor as an effluent stream and the polymerization reaction is quenched, such as with coordinating polar compounds, to prevent further polymerization. On leaving the reactor system the polymer solution is passed through a heat exchanger system en route to a devolatilization system and polymer finishing process. Under certain conditions of temperature and pressure, the polymer solution can phase separate into a polymer lean phase and a polymer rich phase. The copolymer granules and pellets can be recovered from the effluent by coagulation with a non-solvent such as isopropyl alcohol, acetone, or n-butyl alcohol, or the copolymer can be recovered by stripping the solvent or other media with heat or steam. One or more conventional additives such as antioxidants can be incorporated in the copolymer during the finishing procedure. Possible antioxidants include phenyl-beta-naphthylamine; di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline, and/or stabilizing agents such as tocopherols (described further below) or lactones, or other agents as disclosed in WO 2009/007265. The "copolymer granules" are the solid copolymer product of the polymerization reaction between propylene and a comonomer such as ethylene. Granules are made in the reactor. On the other hand, pellets of the present disclosure can be formed by melting granules in the finishing extruder and then forming them by passing through a die plate with pelletizer knife blades at the end of the finishing extruder (typically underwater).

The resulting copolymer granules can be copolymers having an ethylene content (ethylene-derived units) of from 0.1 wt % to 50 wt %, such as from 0.1 wt % to 25 wt %, such as from 0.1 wt % to 20 wt %, such as from 0.1 wt % to 18 wt %, such as from 0.5 wt % to 16 wt %, such as from 1 wt % to 15 wt %, such as from 2 wt % to 12 wt %, such as from 3 wt % to 11 wt %, by weight of the polymer.

The copolymer granules, produced as described in at least any embodiment, are then mixed with an organic peroxide to produce a copolymer composition. The copolymer composition can include the contact product/reaction product between the copolymer and the organic peroxide. A copolymer composition, can include copolymer pellets described herein which are expected to have the same comonomer content as the granules.

It is desirable to control the particle size of the copolymer granules coming from the reactor. One method to accomplish this is by controlling the particle size of the catalyst itself. The key is to keep the granule size and pellet size as small as possible in order to maximize the surface area for the reaction to occur in the solid state. The granule size is generally controlled by the catalyst support. Thus, in at least any embodiment, the average particle size of the catalyst can be reduced from an average diameter of 50 micrometers or less, such as to an average diameter of 20 micrometers to 45 micrometers. For example, in the case of a preferred Ziegler-Natta catalyst, the catalyst size is 45 micrometers but can be as small as 22 micrometers using a different catalyst support. In at least any embodiment, the average particle size of the copolymer granules is reduced from an average diameter of at least 1500 micrometers, or 2000 micrometers to an average diameter of from 100 micrometers to 2,000 micrometers, or from 1,200 micrometers to 2,000 micrometers. For example, granules made from the preferred Ziegler-Natta catalyst are on average 1,939 micrometers but can be even smaller using a different support (e.g., 1,222 micrometers on average). The copolymer can also be in pellet form by having an average diameter of greater than 1,000 micrometers, such as from 2,000 micrometers to 5,000 micrometers, such as from 2,500 micrometers to 4,000 micrometers. The pellet size is controlled at the finishing extruder/underwater pelletizer. In at least any embodiment, the copolymer has a pellet size of 35 pellets/gram to 65 pellets/gram.

For the purpose of the present disclosure, copolymers, such as Vistamaxx™, are used as granules and/or pellets and are further mixed with peroxide under inert atmosphere, in a post-reactor process.

Catalysts for Copolymer Formation

The copolymers may be synthesized by using an appropriate polymerization technique such as, but not limited to, the conventional Ziegler-Natta type polymerizations, and catalysis employing "single-site" organometallic catalysts including, but not limited to, metallocene catalysts. Copolymer granules described herein may be produced by any means of olefin polymerization.

It may be desirable to control the particle size of the copolymer granules or pellets coming from the reactor as the size of the granules or pellets affects the efficiency of the process of the present disclosure (the smaller the granule/pellet size, the greater are the strain hardening and melt strength).

The process of the present disclosure can be performed with any suitable catalysts, for example, a Ziegler Natta catalyst, a metallocene catalyst.

For the purposes of the present disclosure, the term "metallocene" is a catalyst compound containing one or more cyclopentadienyl (Cp) moiety in combination with a transition metal of the Periodic Table of Elements. Suitable metallocene may contain a transition metal of Groups 3 to 10 of the Periodic Table; and at least one ancillary ligand that remains bonded to the transition metal during polymerization. In at least any embodiment, the transition metal is used in a cationic state and stabilized by a cocatalyst or activator. In at least any embodiment, the transition metals are metallocenes of Group 4 of the Periodic Table, such as titanium, hafnium or zirconium which are used in polymerization in the mono-valent cationic state and have one or two ancillary ligands. The important features of such catalysts for coordination polymerization would be the ligand capable of abstraction and that ligand into which the ethylene (olefinic) group can be inserted.

Suitable metallocene catalysts can be used with a cocatalyst which may be alumoxane, such as methylalumoxane. In at least any embodiment, alumoxane may be modified to provide solubility in linear alkanes or be used in slurry, but can be generally used from a toluene solution. Such solutions may include unreacted trialkyl aluminum and the alumoxane concentration can be indicated as moles of aluminoxane per liter (molAl·L$^{-1}$), which includes any trialkyl aluminum which has not reacted to form an oligomer. The alumoxane, when used as cocatalyst, can be used in molar excess, at a mol ratio of 50 or more, such as 100 or more, such as 1000 or less, such as 500 or less, relative to the transition metal.

Preferably, the "metallocene" comprises (or consists of) a Group 4 metal (Ti, Zr, Hf) and one or two or more ligands, preferably two ligands, selected from cyclopentadienyl and ligands isolobal to cyclopentadienyl. Most preferably, the heterogeneous single-site catalyst comprises an asymmetric metallocene, meaning that there is just one cyclopentadienyl ligand, or two cyclopentadienyls that are different from one another and/or have a different substitution pattern from one another. In any embodiment, the cyclopentadienyl group is selected from the group consisting of indenyl, fluorenyl, cyclopenta[b]naphthalenyl, cyclopenta[a]naphthalenyl, cyclopenta[l]phenanthrenyl, cyclopenta[b]anthracenyl, cyclopenta[a]anthracenyl, indeno[1,2-b]anthracenyl, dibenzo[b,h]fluorenyl, benzo[b]fluorenyl, hydrogenated versions thereof, substituted versions thereof (e.g., having groups such as alkyls, aryls, halogens or hydroxy groups pendant and bound to the cyclopentadienyl), and heterocyclic versions thereof (meaning ring structures incorporating non-carbon atoms such as oxygen, nitrogen, sulfur, etc.).

When using the catalysts described above, the total catalyst system will additionally include one or more organometallic compounds as scavenger(s). Such compounds as used in this application are meant to include those compounds effective for removing polar impurities from the reaction environment and for increasing catalyst activity. Impurities can be inadvertently introduced with any of the polymerization reaction components, such as with solvent, monomer and catalyst feed, and adversely affect catalyst activity and stability. It can result in decreasing or even eliminating catalytic activity, such as when ionizing anion precursors activate the catalyst system. The impurities, or catalyst poisons include water, oxygen, polar organic compounds, metal impurities, etc. In at least on embodiment, the poisons are removed before introduction of such into the reaction vessel, for example by chemical treatment or careful separation techniques after or during the synthesis or preparation of the various components, but some minor amounts of organometallic compound will still normally be used in the polymerization process itself Methods for Forming Copolymer Compositions For purposes of the present disclosure, the organic peroxide (e.g., dicetyl peroxydicarbonate) is blended with the copolymer (e.g., Vistamaxx™ propylene-based elastomer), optional alkyl radical scavenger, and optional additive(s) or "combined", such that it coats the copolymer pellets or granules to promote coupling of the copolymer pellets or granules, e.g., to effect a cross-linking reaction. Reactor granules of the copolymer used herein and/or extruded pellets of the copolymer can be used for the production of the copolymer compositions. In at least any embodiment, reactor granules of copolymer used herein provide significant enhancing results of the strain hardening and the melt strength over extruded pellets when mixed with the organic peroxide. Such copolymers, such as ethylene-propylene copolymer granules, flakes or pellets can be dry blended with the organic peroxide before "combining" in a reactive extrusion process as described below. This can take place in any type of suitable dry blending apparatus that can blend the ingredients, such as mix and/or stir them to enhance contact between the ingredients prior to combining in a reactive extrusion process. In at least any embodiment, the copolymer, in whatever form (granule or pellets), may be used to below its melting point temperature prior to or concurrently with dry blending with the organic peroxide, for instance, to a temperature close or equal to room temperature. In at least any embodiment, the organic peroxide and ethylene-propylene copolymer are combined at such temperature for 10 sec to 30 min, such as for 30 seconds to 10 min, such as for 30 seconds to 180 seconds, such as 90 seconds, prior to melt extrusion as described below.

In at least any embodiment, the amount of organic peroxide that is combined, contacted or otherwise "mixed" with the copolymer granules and/or pellets is within a range from 0.4 wt % to 2 wt %, such as from 0.5 wt % to 1.5 wt %, such as from 0.6 wt % to 1.4 wt %, such as 0.8 wt % to 1.2 wt %, such as from 0.9 wt % to 1 wt %, by weight of the ethylene-propylene copolymer granules and/or pellets and organic peroxide. In at least any embodiment, the mixing occurs in the presence of an inert gas, for instance in the presence of a flow of nitrogen or argon gas. In at least any embodiment, the mixing occurs in a homogenizer at a rate of at least 50,000 lbs of polymer/hour, such as 60,000 lbs of polymer/hour, such as 80,000 lbs of polymer/hour.

Finally, the use of a cooling apparatus or any type of cooling means is present in the process, either any of the individual steps, or all of the steps. Thus, the combining and mixing steps may occur below the polymerization temperature, where cooling can be applied in the mixing step to cool the temperature further so that the reaction can occur at or close to room temperature.

For manufacturing purposes, the resulting copolymer compositions formed via mixing the dicetyl peroxydicarbonate and the copolymer (e.g., Vistamaxx™ propylene-based elastomer) can be stored as pellets.

Alkyl Radical Scavenger

The polymers and polymer composition herein may include one or more alky radical scavengers. The "alkyl radical scavenger" is a compound or combination of compounds selected from hydroxyl amine, hydroxyl amine-containing compounds, lactone, lactone-containing compounds, chromanol, and chromanol-containing compounds and capable of reacting with an alkyl radical compound to render it neutral (no radical centers present). In at least any embodiment, the alkyl radical scavenger is selected from 6-chromanol-containing compounds, such as tocopherol and derivatives thereof (e.g., alpha, beta, gamma, delta, and $C_{10}$ to $C_{26}$ side chain).

In at least any embodiment, the alkyl-radical scavenger is present in the compositions, or blend used in the process described herein, within a range from 5 ppm to 4000 ppm, such as from 20 ppm to 3000 ppm, such as from 50 ppm to 2000 ppm, such as from 100 ppm to 1000 ppm, such as from 125 ppm to 800 ppm, such as from 130 ppm to 400 ppm, such as from 135 ppm to 200 ppm, such as from 140 ppm to 160 ppm.

In at least any embodiment, the alkyl-radical scavenger is selected from 6-chromanol-containing compounds. An alkyl-radical scavenger can be selected from tocopherol and derivatives thereof (e.g., alpha, beta, gamma, delta, and $C_{10}$ to $C_{26}$ side chain). For example, an alkyl-radical scavenger can be represented by formula (I):

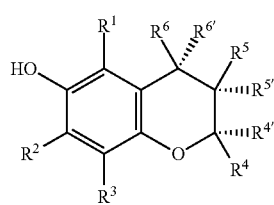

(I)

wherein each of $R^1$, $R^2$, $R^3$ and $R^6/R^{'6}$ is independently selected from hydrogen and $C_1$ to $C_{10}$ linear alkyls or branched alkyls, such as hydrogen and $C_1$ to $C_5$ linear and branched alkyls, such as $R^1$, $R^2$, $R^3$ and $R^6/R^{'6}$ are selected from hydrogen and methyl groups; and each of $R^4$ and $R^5$ (and $R^{4'}$ and $R^{5'}$) is independently selected from hydrogen and $C_1$ to $C_{30}$ linear or branched alkyls; such as, either one of $R^4$ or $R^5$ (and $R^{4'}$ and $R^{5'}$) are independently selected from $C_5$ to $C_{24}$ branched alkyls; such as either one of $R^4$ or $R^5$ (and $R^{4'}$ and $R^{5'}$) are independently selected from $C_{10}$ to $C_{20}$ branched alkyls, wherein the other of $R^4$ or $R^5$ (and $R^{4'}$ and $R^{5'}$) is hydrogen. For instance, each of $R'$, $R^2$ and $R^3$ may be methyl groups, while $R^5$ and $R^6$ is hydrogen, and $R^4$ is a branched $C_{16}$ group, such as the case with α-tocopherol. The stereochemistry at the $R^4$ can be a mixture of chiral centers.

The substitutions or branching on the longer $R^4$ and/or $R^5$ can be any alkyl group, such as methyl groups, on at least one carbon along the main carbon chain. In at least any embodiment, an alkyl-radical scavenger is dl-α-tocopherol and/or its salts and $C_1$ to $C_3$ (any $R^1$ to $R^4$, and/or $R^6$ group) derivatives.

Additives

The copolymer compositions of the present disclosure may further include "additives" within the range from 0.01 wt % to 1 wt %, or 2 wt %, or 3 wt %, or 4 wt %, or 5 wt %, by weight of the copolymer composition, such additives can include one or more fillers, antioxidants (e.g., hindered phenolics such as Irganox™ 1010 or Irganox™ 1076 available from Ciba-Geigy), phosphites (e.g., Irganox™ 168 available from Ciba-Geigy), radical scavengers such as vitamin E, anti-cling agents, tackifiers (such as polybutenes, terpene resins, aliphatic and aromatic hydrocarbon resins, alkali metal and glycerol stearates, and hydrogenated rosins), UV stabilizers, heat stabilizers, anti-blocking agents, release agents, anti-static agents, pigments, colorants, silicon dioxide, titanium dioxide, polydimethylsiloxane, talc, dyes, wax, calcium sterate, carbon black, low molecular weight resins and glass beads, or a combination thereof, and these additives can be present at from 0.1 ppm to 1000 ppm. Neutralizers, lubricants, surfactants and/or nucleating agents may also be present. In at least any embodiment, a copolymer composition may include up to 0.5 wt %, by weight of the composition, of one or more antioxidants, or one or more antioxidants and one or more foaming agents.

In at least any embodiment, if a colorant (dye, pigments, whitening agent, carbon black, etc.) is desired as part of the copolymer composition, such colorant may be blended with granules or pellets of copolymer having a peak melting point temperature within a range from 110° C. to 140° C. or 145° C. or 150° C. The colorant and granules/pellets of this copolymer can be dry blended, alternatively along with other additives such as antioxidants and nucleating agents, and then melt blended such as in an extruder. For example, suitable copolymer can have a melt flow rate (ASTM D1238, 230° C., 2.16 kg) within a range from 1 g/10 min to 10 g/10 min, such as from 1.2 g/10 min to 9 g/10 min, such as from 1.4 g/10 min to 8 g/10 min. The colorant may be present up to 60-90 wt % based on the weight of the colorant and copolymer combination, limited by the ability of the copolymer to hold the colorant and the energy required to compound/extrude. This copolymer/colorant concentrate or "masterbatch" can then be combined (for example, from 0.1 wt % to 3 wt %, alternatively, from 0.1 wt % to 5 wt %) with the copolymer and organic peroxide, or the resultant composition, to produce the colored versions of desirable compositions.

One or more conventional additives such as antioxidants can be incorporated in the polymer composition during the finishing procedure. Possible antioxidants include phenyl-beta-naphthylamine; di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline, and/or stabilizing agents such as tocopherols or lactones, or other agents as disclosed in WO 2009/007265.

In at least embodiment of the present disclosure, an additive is a coagent which may influence the melt flow rate of a copolymer and/or enhance the degree of modification of a copolymer. Without being bound by theory, a coagent is generally understood to be a polyfunctional reactive additive such as a polyunsaturated compound which will react rapidly with polymer radicals, will overcome steric hindrance effects and minimize undesirable side reactions. Further information coagents is set forth in 61 RUBBER CHEMISTRY AND TECHNOLOGY, 238-254 (1988), and W. Hofmann, Progress in 1(2) RUBBER AND PLASTICS TECHNOLOGY, 18-50 (1985).

A wide variety of suitable coagents are commercially available including di- and triallyl compounds, di- and tri(meth)acrylate compounds, bismaleimide compounds, 1,3-diisopropenylbenzene and its oligomer, vinyl toluene, vinyl pyridine, parachinone dioxime, 1,2-cis-polybutadiene and their derivatives. In at least any embodiment, coagents include triallyl cyanurate, triallyl isocyanurate, ethylene glycol dimethacrylate and trimethylolpropane trimethacrylate and other bifunctional agents such as divinyl benzene, isoprene, or polyisobutylene and other conjugated dienes. Further examples of bifunctional agents are those with moieties such as hydroxyl, mercaptans, sulfide, and imide groups including 1,4-benzenediol and furfuryl sulphide. Examples of dienes used as coagents include, but are not limited to, dicyclopentadiene, 1,3-cyclopentadiene, divinylbenzene, 1,4-hexadiene, 1,4-cyclohexadiene, 1,5-hexadiene, 5-methyl-1,4-hexadiene, 1,6-octadiene, 1,7-octadiene, 3,7-dimethyl-1,6-octadiene, 1,9-decadiene, 1,13-tetradecadiene, 5-methylene-2-norbornene, 5-ethylidene-2-norbornene, 5-vinyl-2-norbornene, or a combination thereof.

The incorporation of an effective amount of one or more of these coagents into a copolymer composition may influence the melt flow rate and increase the strain hardening and long chain branching character of the copolymer composition.

Organic Peroxides

Copolymer compositions of the present disclosure, such as ethylene-propylene copolymer compositions, can be produced as granules and/or pellets by mixing a copolymer with organic peroxide(s). The "copolymer composition" is the product (contact product and/or reaction product) of organic peroxide and copolymer granules or pellets. The copolymer and copolymer compositions described herein are expected to have the same comonomer content as the granules.

An "organic peroxide" is any organic compound including at least one —(O)COO— group and/or —O—O— group, and may possess a 1 hour half-life temperature ($^1T_{1/2}$) of less than 100° C., such as less than 85° C., such as less than 75° C., such as less than 65° C. as determined in an aromatic and/or halogenated aromatic solvent, such as having a ($^1T_{1/2}$) within a range from 25° C. to 100° C., such as from 35° C. to 80° C., such as from 45° C. to 65° C.

In at least any embodiment, the organic peroxide is selected from compounds represented by one or more structures selected from (a) and (b):

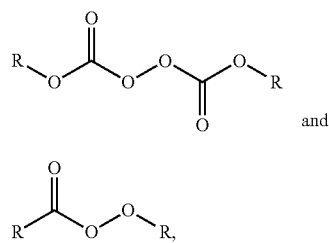

wherein each "R" group is independently selected from hydrogen, $C_1$ or $C_5$ to $C_{24}$ or $C_{30}$ linear alkyls, $C_1$ or $C_5$ to $C_{24}$ or $C_{30}$ secondary alkyls, $C_1$ or $C_5$ to $C_{24}$ or $C_{30}$ tertiary alkyls, $C_7$ to $C_{34}$ alkylaryls, $C_7$ to $C_{34}$ arylalkyls, and substituted versions thereof.

In at least any embodiment, the organic peroxide is selected from the structures represented by formula (a). By "substituted" what is meant is a hydrocarbon "R" group having substituent(s) such as halogens, carboxylates, hydroxyl groups, amines, mercaptans, and phosphorous containing groups. In at least any embodiment, each "R" group is independently selected from $C_8$ to $C_{20}$ or $C_{24}$ linear, secondary, or tertiary alkyls, such as octyl, decyl, lauryl, myristyl, cetyl, arachidyl, behenyl, erucyl and ceryl groups and linear, secondary or tertiary versions thereof. Organic peroxides can include di-sec-butyl peroxydicarbonate, diisopropyl peroxydicarbonate, dicyclohexyl peroxydicarbonate, di(4-tert-butylcyclohexyl) peroxydicarbonate, dicetyl peroxydicarbonate, dibutyl peroxydicarbonate, di(2-ethylhexyl) peroxydicarbonate, didodecyl peroxydicarbonate, diicosyl peroxydicarbonate, and ditetracosyl peroxydicarbonate.

In at least any embodiment, the melting point of the organic peroxide is within a range from 30° C. to 75° C., such as from 40° C. to 65° C., such as from 45° C. to 55° C. Also, in at least any embodiment, the solid, neat organic peroxide has a bulk density within a range from 0.4 g/cm³ to 0.8 g/cm³, such as from 0.5 g/cm³ to 0.7 g/cm³. In at least any embodiment, the organic peroxide is in the form of solid granules, flakes, particles, powder, or other solid "granular" form. It may be used in its neat form or as a masterbatch with an inert polymer matrix, or solution with an inert solvent. The size and shape of the organic peroxide can be tailored by low temperature methods such as prilling or compaction, or other known means.

In at least any embodiment, the amount of organic peroxide that is combined, contacted or otherwise "mixed" with copolymer granules and/or pellets is within a range from 0.4 wt % to 2 wt %, such as from 0.5 wt % to 1.8 wt %, such as 0.6 wt % to 1.6 wt %, such as from 0.7 wt % to 1.5 wt %, or alternately from 1 wt % to 2 wt % by weight of the copolymer composition.

Solid as well as liquid peroxydicarbonates may be used in a process according to the present disclosure. A solution of a peroxydicarbonate in an inert solvent, such as isododecane, or in the form of frozen flakes, may also be used. In at least any embodiment, peroxydicarbonate is used as a solid peroxydicarbonate, in the form of, for example, flakes, finely divided particles (powder), or a liquid peroxydicarbonate, optionally adsorbed on or absorbed in a suitable carrier, such as silica or polypropylene powder or pellets. The use of a solid peroxydicarbonate permits a higher storage and processing temperature. Such higher temperature is beneficial when the peroxydicarbonate is to be introduced into an extruder using (loss-in-weight) feeders.

A peroxydicarbonate can be represented by the formula $R^1$—OC(O)OOC(O)O—$R^2$, wherein $R^1$ and $R^2$ are independently selected from $CH_3$, 2-i-$C_3H_7O$—$C_6H_4$, $C_2H_5CH(CH_3)$, 4-$CH_3$—$C_6H_4$, $Cl_3CC(CH_3)_2$, $C_7H_{15}$, $C_6H_{11}CH_2$, 3-t-$C_4H_9$—$C_6H_5$, $Cl_3Si(CH_2)_3$, $C_6H_5$, $CH_3CH(OCH_3)CH_2CH_2$, $C_6H_5OCH_2CH_2$, $C_6H_5CH_2$, Z—$C_8H_{17}CH$=CH$(CH_2)_8$, 2-$CH_3$—$C_6H_4$, $(CH_3)_2CHCH_2CH(CH_3)$, 3,4-di-$CH_3$—$C_6H_3$, $Cl_3C$, $CHCH(C_1)$, $ClCH_2$, $[C_2H_5OC(O)]_2CH(CH_3)$, 3,5-di-$CH_3$—$C_6H_3$, $C_8H_{17}$, $C_2H_5$, $C_{18}H_{37}$, 2-oxo-1,3-dioxolan-4-$CH_2$, $C_2H_5CH(Cl)CH_2$, 4-$CH_3O$—$C_6H_4$, i-$C_4H_9$, $CH_3SO_2CH_2CH_2$, $C_{12}H_{25}$, $C_6H_5CH(Cl)CH_2$, $H_2C$=$CHC(O)OCH_2CH_2$, 4-$NO_2$—$C_6H_4$, $C_4H_9$, $C_{10}H_{21}$, $C_4H_9CH(C_2H_5)CH_2$, $H_2C=CHCH_2$, 2-Cl-c-$C_6H_{10}$, $H_2C=C(CH_3)CH_2$, c-$C_6H_{11}$, $ClCH_2CH_2$, 4-[$C_6H_5$—N=N]—$C_6H_4CH_2$, $C_{16}H_{33}$, 1-naphtyl, 4-t-$C_4H_9$—$C_6H_{10}$, 2,4,5-tri-Cl—$C_6H_2$, Cl($CH_2$)$_3$, $C_{14}H_{29}$, 9-fluorenyl, 4-$NO_2$—$C_6H_4CH_2$, 2-i-$C_3H_7$—$C_6H_4$, $CH_3OCH_2CH_2$, $H_2C=C(CH_3)$, 3-$CH_3$—$C_6H_4$, $BrCH_2CH_2$, 3-$CH_3$-5-i-$C_3H_7$—$C_6H_3Br_3CCH_2$, $C_2H_5OCH_2CH_2$, 4-$CH_3OC(O)$—$C_6H_4$, $H_2C=CH$, i-$C_3H_7$, 2-$C_2H_5CH(CH_3)$—$C_6H_4$, $Cl_3CCH_2$, $C_{51}$—$H_{11}$, c-$C_{12}H_{23}$, 4-t-$C_4H_9$—$C_6H_4$, $C_6H_{13}$, $C_3H_7$, $CH_3OCH_2CH_2$, $C_6H_{13}CH(CH_3)$, $CH_3OC(CH_3)_2CH_2CH_2$, $C_3H_7OCH_2CH_2$, $CH_3OCH_2CH(CH_3)$, 2-i-$C_3H_7$-5-$CH_3$-c-$C_6H_9$, $C_4H_9OCH_2CH_2$, t-$C_4H_9$, $(CH_3)_3CCH_2$, wherein "i" is iso, "t" is tertiary, and "Z" is cis. In at least any embodiment, peroxydicarbonate is bis(4-tert-butylcyclohexyl) peroxydicarbonate, dicetyl peroxydicarbonate, and/or dimyristyl peroxydicarbonate, which peroxides are solid at room temperature, and diisopropylperoxydicarbonate, di-n-butylperoxydicarbonate and bis(2-ethylhexyl)peroxydicarbonate, which are liquid at room temperature, either pure or as a solution in isododecane. Optionally, a combination of peroxydicarbonates and other peroxides may be employed in order to influence the melt flow rate of the copolymer and/or enhance the degree of modification of the copolymer. The quantity of peroxydicarbonate to be used will be dependent on the desired degree of copolymer modification and on the copolymer (e.g., a propylene-based elastomer) employed.

In at least any embodiment, the organic peroxide used for the formation of a copolymer composition with enhanced melt strength and strain hardening behavior is a low temperature decomposition peroxide, such as dicetyl peroxydicarbonate. Dicetyl peroxydicarbonate can be mixed with copolymer granules and/or pellets at room temperature for instance, under inert atmosphere (such as nitrogen).

Copolymer Compositions and Foamed Articles

Compositions of the present disclosure may be used in foamed applications. In an extrusion foaming process, a blowing agent, such as, for example, carbon dioxide, nitrogen, or a compound that decomposes to form carbon dioxide or nitrogen, is injected into a polymer melt by means of a metering unit. The blowing agent is then dissolved in the polymer in an extruder, and pressure is maintained throughout the extruder. A rapid pressure drop rate upon exiting the extruder creates a foamed polymer having a homogenous cell structure. The resulting foamed product can be light, strong, and suitable for use in a wide range of applications in industries such as packaging, automotive, aerospace, transportation, electric and electronics, and manufacturing.

In at least any embodiment, physical blowing agents such as inert gases (e.g., $CO_2$, $N_2$) and/or hydrocarbons (e.g. butanes, pentanes, etc.) are injected into the polymer melt by means of a metering unit. Chemical blowing agents that decompose form gases such as $CO_2$ and $N_2$ such as blends of citric acid and sodium bicarbonate (Hydrocerol from Clariant) added physically to the polymer pellets in the extruder. In some embodiments, both physical and chemical blowing agents are used together. Chemical blowing agents can be, for example, added in physical form as a masterbatch or pellet, and not metered like a gas.

The copolymer composition pellets resulting from the processes of the present disclosure have a number of features. In at least any embodiment, the copolymer composition pellets have a melt strength (pull-off-force) of 1 cN to 15 cN, such as 1.02 cN to 12 cN, such as 1.04 cN to 11 cN, such as 1.06 cN to 10.5 cN.

The copolymer composition pellets formed from the copolymer granules mixed with the organic peroxide also exhibit strain hardening as evidenced by an increase in the viscosity as the melt is drawn in a rheometer, as described below, with values that are much higher than the copolymer composition pellets formed from the copolymer pellets mixed with the organic peroxide.

The copolymer composition pellets formed from the copolymer pellets mixed with the organic peroxide exhibit strain hardening as evidenced by an increase in the viscosity as the melt is drawn in a rheometer, as described below, with an increased value as the amount of the organic peroxide increases, to a viscosity of 4,000 Pa or greater, such as of 20,000 Pa or greater, such as of 40,000 Pa or greater, such as of 45,000 Pa or greater above the linear-viscoelastic (LVE) range at a rate within a range from 1 sec$^{-1}$ to 10 sec$^{-1}$. Extensional viscosity of the pellets obtained under these conditions ranges from 4,000 Pa·s to 45,000 Pa·s. In at least any embodiment, the pellets may exhibit the aforementioned strain hardening values even when as little as 1 wt %, or 1.5 wt %, or 2 wt % organic peroxide is mixed with the copolymer composition granules.

The copolymer composition pellets formed from the copolymer granules mixed with the organic peroxide can exhibit greater strain hardening (when compared to the pellets) as evidenced by an increase in the viscosity as the melt is drawn in a rheometer, as described below, with an increased value as the amount of the organic peroxide increases, to a viscosity of 5,000 Pa or greater, such as of 20,000 Pa or greater, such as of 40,000 Pa greater, such as of 50,000 Pa or greater, such as of 100,000 Pa or greater, such as of 150,000 Pa or greater, such as of 300,000 Pa or greater, such as of 400,000 Pa or greater, such as of 500,000 Pa or greater, such as of 600,000 Pa or greater, above the linear-viscoelastic (LVE) range at a rate within a range from 1 sec$^{-1}$ to 10 sec$^{-1}$. Extensional viscosity of the pellets obtained under these conditions ranges from 6,000 Pa·s to 650,000 Pa·s. In at least any embodiment, the copolymer composition pellets exhibit such strain hardening values even when as little as 1 wt %, or 1.5 wt %, or 2 wt % organic peroxide is mixed with the granules.

Furthermore, it was found that strain hardening of copolymer composition granules increases when ethylene content of the copolymers increases. For example, at a draw ratio value of 4, strain hardening of copolymer composition granules formed from a copolymer including an ethylene content of 4 wt % may increase by 35% as compared to copolymer composition granules formed from a copolymer including an ethylene content of 11 wt %.

The mixing of the copolymer granules and subsequent melt blending imparts certain properties to the resulting copolymer compositions and pellets. In at least any embodiment, a copolymer composition pellet formed from copolymer granules has a branching index (g'vis) of 0.89 to 0.91, wherein the copolymer composition pellet formed from copolymer pellets has a g'vis value greater than 0.95, such as from 0.95 to 1. Also, in at least any embodiment, a copolymer composition pellet formed from copolymer pellets has a melt strength (pull-off-force) of 0.1 cN to 5 cN, such as from 0.2 cN to 4.5 cN, such as from 0.3 cN to 4 cN. In at least any embodiment, a copolymer composition pellet formed from granules has a melt strength (pull-off-force) of 0.1 cN to 12 cN, such as from 0.2 cN to 11 cN, such as from 0.3 cN to 10.5 cN.

In at least any embodiment, a copolymer composition pellet formed from copolymer granules or pellets has a melt flow rate (MFR, ASTM D1238, Condition L, 230° C. and 2.16 kg) of from 1 g/min to 10 g/10 min, such as from 1.2 g/10 min to 9 g/10 min, such as from 1.5 g/10 min to 8 g/10 min. In at least any embodiment, a copolymer composition pellet formed from copolymer granules has a lower MFR (higher number and weight average molecular weight) than a copolymer composition pellet form from copolymer pellets, as the pellets are the product of the reactive extrusion between the granules and organic peroxide. A copolymer exhibiting an MFR1 before reaction with the organic peroxide exhibits an MFR2 which is lower than MFR1 as the amount of organic peroxide used for the process increases, even more so when the copolymer is under a granular form, and when the ethylene content of the copolymer increases, likely due to the larger surface area for the reaction to occur.

In at least any embodiment, a copolymer composition formed from copolymer granules or pellets has a molecular weight distribution (Mw/Mn) of from 1 to 2.5 (narrow PDI), such as from 1.1 to 2.4, such as from 1.2 to 2.3, such as from 1.3 to 2.2. In at least any embodiment, a copolymer composition formed from copolymer granules or pellets has an $Mz_{MALLS}/Mw_{MALLS}$ of from 1 to 3, such as from 1.2 to 2.8, such as from 1.4 to 2.7.

In at least any embodiment, the copolymer is a copolymer which after treatment with peroxide provides a copolymer composition (pellet form) having a melt strength within the range from 1 cN to 11 cN, and a branching index ($g'_{vis}$) of 0.978 or less, and other features as described herein. In at least any embodiment, the copolymer after treatment with peroxide can provide a composition (pellet form) including cross-linked copolymer, carbon dioxide, and a $C_6$ to $C_{30}$ alcohol such as cetyl alcohol. The alcohol can be present, if at all, at a level of from 0.01 wt % to 2 wt %, such as from 0.01 wt % to 1 wt %, such as from 0.01 wt % to 0.5 wt % by weight of the copolymer composition.

A copolymer composition (pellet form) may have a number average molecular weight (Mn), by DRI analysis, within a range from 50,000 g/mole to 150,000 g/mole, such as from 70,000 g/mole to 135,000 g/mole, such as from 95,000 g/mole to 120,000 g/mole. In at least any embodiment, the copolymer composition has a weight average molecular weight ($Mw_{MALLS}$) (pellet form), by MALLS analysis, within the range from 100,000 g/mole to 400,000 g/mole, such as from 150,000 g/mole to 350,000 g/mole, such as from 200,000 g/mole to 300,000 g/mole. In at least any embodiment, the copolymer composition (pellet form) has a z-average molecular weight ($Mz_{MALLS}$), by MALLS analysis within the range from 100,000 g/mole to 1,400,000 g/mole, such as from 125,000 g/mole to 1,200,000 g/mole, such as from 150,000 g/mole to 1,000,000 g/mole, such as from 175,000 g/mole to 900,000 g/mole, such as from 200,000 g/mole to 800,000 g/mole, such as from 290,000 g/mole to 770,000 g/mole.

As an indicator of its high molecular weight component or "tail", the copolymer composition (pellet form) can have an $Mz_{MALLS}/Mw_{MALLS}$ value of from 1 to 6, such as from 1 to 5, such as from 1 to 4, such as from 1.2 to 3.5, such as from 1.4 to 3. Also, the copolymer composition can have an $Mz_{MALLS}/Mn_{MALLS}$ value within a range from 1 to 10, such as from 1.5 to 8, such as 2 to 6. In at least any embodiment, the copolymer composition has a $Mw_{MALLS}/Mn_{MALLS}$ ($MWD_{MALLS}$) value within a range from 1 to 5, such as from 1.2 to 4, such as from 1.4 to 3, such as from 1.6 to 2.5.

In at least any embodiment, a copolymer composition (pellet form) has a Peak Extensional Viscosity of from $1\times10^3$ Pa·s to $1\times10^7$ Pa·s, such as from $1\times10^4$ Pa·s to $1\times10^6$ Pa·s at a strain rate of 0.01/sec (190° C.).

Copolymer composition pellets thus produced can be formed into useful articles. For instance, a foamed article can be formed from the copolymer and/or additive (e.g., filler, anti-oxidant, alkyl-radical scavenger etc.). Suitable foaming agents in forming foamed articles described herein may be normally gaseous, liquid or solid compounds or elements, or mixtures thereof. These foaming agents may be characterized as either physically-expanding or chemically decomposing. Of the physically expanding foaming agents, the term "normally gaseous" is intended to mean that the expanding medium employed is a gas at the temperatures and pressures encountered during the preparation of the foamable compound, and that this medium may be introduced either in the gaseous or liquid state as convenience would dictate. Such agents can be added to the a copolymer composition by blending the dry polymer with the foaming agent followed by melt extrusion, or by blending the agents in the polymer melt during extrusion. The foaming agent, especially gaseous agent, may be blended with the polymer melt as it exits the melt extruder or mold that is used for forming the foamed articles (such as a copolymer composition pellet). The concentration of the foaming agent may be within a range from 100 ppm to 5000 ppm, such as from 200 ppm to 4000 ppm, such as from 300 ppm to 3000 ppm, such as from 400 ppm to 2000 ppm, such as from 500 ppm to 1000 ppm, or within the copolymer composition.

Included among exemplary, normally gaseous and liquid foaming agents are the halogen derivatives of methane and ethane, such as methyl fluoride, methyl chloride, difluoromethane, methylene chloride, perfluoromethane, trichloromethane, difluoro-chloromethane, dichlorofluoromethane, dichlorodifluoromethane, trifluorochloromethane, trichloromonofluoromethane, ethyl fluoride, ethyl chloride, 2,2,2-trifluoro-1,1-dichloroethane, 1,1,1-trichloroethane, difluorotetrachloroethane, 1,1-dichloro-1-fluoroethane, 1,1-difluoro-1-chloroethane, dichloro-tetrafluoroethane, chlorotrifluoroethane, trichlorotrifluoroethane, 1-chloro-1,2,2,2-tetrafluoroethane, 1,1-difluoroethane, 1,1,1-trifluoroethane, 1,1,1,2-tetrafluoroethane, perfluoroethane, pentafluoroethane, 2,2-difluoropropane, 1,1,1-trifluoropropane, perfluoropropane, dichloropropane, difluoropropane, chloroheptafluoropropane, dichlorohexafluoropropane, perfluorobutane, perfluorocyclobutane, sulfur-hexafluoride, and mixtures thereof. Other normally gaseous and liquid foaming agents that may be used are hydrocarbons and other organic compounds such as acetylene, ammonia, butadiene, butane, butene, isobutane, isobutylene, dimethylamine, propane, dimethylpropane, ethane, ethylamine, methane, monomethylamine, trimethylamine, pentane, cyclopentane, hexane, propane, propylene, alcohols, ethers, ketones, and the like. Inert gases and compounds, such as nitrogen, argon, neon or helium, can also be used as foaming agents.

Solid, chemical foaming agents, which may decompose at elevated temperatures to form gasses, can be used to expand the copolymer composition. In general, the decomposable foaming agent will have a decomposition temperature (with the resulting liberation of gaseous material) from 130° C. to 350° C., such as from 200° C. to 300° C.

Exemplary chemical foaming agents include azodicarbonamide, p,p'-oxybis(benzene) sulfonyl hydrazide, p-toluene sulfonyl hydrazide, p-toluene sulfonyl semicarbazide, 5-phenyltetrazole, ethyl-5-phenyltetrazole, dinitroso pentamethylenetetramine, and other azo, N-nitroso, carbonate and sulfonyl hydrazide compounds as well as various acid/bicarbonate compounds which decompose when heated. Representative volatile liquid foaming agents include isobutane, difluoroethane or blends of the two. For decomposable solid foaming agents, azodicarbonamide can be used, while for inert gasses, carbon dioxide can be used.

Furthermore, processes for producing foam structures from copolymer composition pellets can be used to form foamed articles. A foamed article (made from copolymer composition pellets) of the present disclosure may take any physical configuration, such as sheet, plank, other regular or irregular extruded profile, and regular or irregular molded bun stock. Exemplary of other useful forms of foamed or foamable objects include expandable or foamable particles, moldable foam particles, or beads, and articles formed by expansion and/or consolidation and fusing of such particles. In at least any embodiment, the foamable article may be cross-linked prior to expansion, such as for the process of free-radical initiated chemical cross-linking or ionizing radiation, or subsequent to expansion. Cross-linking subsequent to expansion may be effected if desired by exposure to chemical cross-linking agents or radiation or, when silane-grafted polymers are used, exposure to moisture optionally with a suitable silanolysis catalyst.

Copolymer composition pellets disclosed herein can be used to make foamed structures having any suitable density, such as a density value may be within the range from 0.1 g/cm$^3$ to 0.6 g/cm$^3$. For certain applications that involve higher density such as structural components or automotive components, a lower melt strength copolymer can be used alone or blended with a higher melt strength copolymer to obtain a copolymer composition that can form foam densities within a range from 0.4 g/cm$^3$ to 0.5 g/cm$^3$, for example. For lower foam density applications such as in food containers, the higher melt strength copolymer compositions described herein can be used alone or also blended to adjust the foam density to within, for example, a foam density of 0.1 g/cm$^3$ to 0.3 g/cm$^3$. Thus, for example, copolymer granules can be blended with copolymer composition pellets to create any desired foaming density for a particular end use.

Methods of combining the various ingredients of the foamable copolymer compositions include but are not limited to melt-blending, diffusion-limited imbibition, liquid-mixing, and the like, optionally with prior pulverization or other particle-size reduction of any or all ingredients. Melt-blending may be accomplished in a batchwise or continuous process, and can be carried out with temperature control. Furthermore, many suitable devices for melt-blending, including those with single and multiple Archimedean-screw conveying barrels, high-shear "Banbury" type mixers, and other internal mixers can be used. The object of such blending or mixing is to provide a uniform mixture. One or more components may be introduced in a step-wise fashion, either later during an existing mixing operation, during a subsequent mixing operation or, as would be the case with an extruder, at one or more downstream locations into the barrel.

Expandable or foamable copolymer composition pellets will have a foaming agent incorporated therein, such as a decomposable or physically expandable chemical blowing agent, so as to effect the expansion in a mold upon exposure of the composition to the appropriate conditions of heat and, optionally, the sudden release of pressure. Copolymer compositions may find many uses as foamed articles including as automotive components, insulation and other construction components, food containers, sports equipment, and other domestic and commercial uses.

Copolymer composition pellets can also be thermoformed to make useful thermoformed articles. A copolymer composition described herein can desirably be formed into films or sheets suitable for thermoforming processes. Thermoforming is a manufacturing process where the copolymer composition is formed into a film and heated to a pliable forming temperature, formed to a specific shape in a mold, and trimmed to create a usable product. The film, or "sheet" when referring to thinner gauges and certain material types, is heated in an oven to a high-enough temperature that permits it to be stretched into or onto a mold and cooled to a finished shape. Its simplified version is vacuum forming.

In at least any embodiment, a small tabletop or lab size machine is used to heat small cut sections of a copolymer composition sheet and stretch it over a mold using vacuum. This method is often used for sample and prototype parts. In complex and high-volume applications, very large production machines can be utilized to heat and form the copolymer composition sheet and trim the formed parts from the sheet in a continuous high-speed process. The copolymer composition described herein may be suitable for both types of thermoforming.

One desirable type of thermoforming is thin-gauge thermoforming. Thin-gauge thermoforming is primarily the manufacture of disposable cups, containers, lids, trays, blisters, clamshells, and other products for the food, medical, and general retail industries. Thick-gauge thermoforming includes parts as diverse as vehicle door and dash panels, refrigerator liners, utility vehicle beds, and plastic pallets. Heavy-gauge forming utilizes the same basic process as continuous thin-gauge sheet forming, thus draping the heated copolymer composition sheet over a mold. Many heavy-gauge forming applications use vacuum only in the form process, although some use two halves of mating form tooling and include air pressure to help form.

In at least any embodiment, a sheet including the copolymer composition is fed from a roll or from an extruder into a set of indexing chains that transport the sheet through an oven for heating to forming temperature. The heated sheet then indexes into a form station where a mating mold and pressure-box close on the sheet, with vacuum then applied to remove trapped air and to pull the material into or onto the mold along with pressurized air to form the copolymer composition to the detailed shape of the mold. Plug-assists can be used in addition to vacuum in the case of taller, deeper-draw formed parts in order to provide the needed material distribution and thicknesses in the finished parts. In any case, after a short cycle, a burst of reverse air pressure can be actuated from the vacuum side of the mold as the form tooling opens to break the vacuum and assist the formed parts off of, or out of, the mold. A stripper plate may also be utilized on the mold as it opens for ejection of more detailed parts or those with negative-draft, undercut areas. The formed parts formed from copolymer composition film then index into a trim station, where a die cuts the parts from the remaining sheet web, or indexes into a separate trim press where the formed parts are trimmed. The sheet web remaining after the formed parts are trimmed can be wound onto a take-up reel or fed into an inline granulator for recycling.

Copolymer compositions made using the disclosed processes herein can find use in making many thermoformed articles such as automotive components, construction components, electronic devices, medical equipment, sports equipment, food containers, appliances, and other domestic and commercial uses. Similarly, a copolymer composition can find use as a thermoformed article made from injection molding, blow molding, and rotational molding processes.

EXAMPLES

Melt Flow Rates. All melt flow rates (MFR) were determined using ASTM D1238 at 230° C. with 2.16 kg load.

Measurements took place using ethylene-propylene copolymers having the additives listed below.

Branching Index and Molecular Weight Determinations. The branching indexes and molecular weights were determined by using a high temperature GPC (Agilent PL-220), equipped with three in-line detectors, a differential refractive index detector ("DRI"), a light scattering ("LS") detector, in conjunction with a viscometer. Detector calibration is described in a paper by T. Sun, P. Brant, R. R. Chance, and W. W. Graessley, in 34(19) MACROMOLECULES, 6812-6820 (2001) and references therein. Three Agilent PLgel 10 μm Mixed-B LS columns were used for the GPC tests herein. The nominal flow rate was 0.5 mL/min, and the nominal injection volume was 300 μL. The various transfer lines, columns, viscometer and differential refractometer (the DRI detector) were contained in an oven maintained at 145° C. Solvent for the experiment was prepared by dissolving 6 grams of butylated hydroxytoluene as an antioxidant in 4 liters of Aldrich reagent grade 1,2,4-trichlorobenzene ("TCB"). The TCB mixture was then filtered through a 0.1 μm polytetrafluoroethylene filter. The TCB was then degassed with an online degasser before entering the GPC. Polymer solutions were prepared by placing dry polymer in a glass container, adding the desired amount of TCB, then heating the mixture at a temperature of 160° C. with continuous shaking for 2 hours. All quantities were measured gravimetrically. The TCB densities used to express the polymer concentration in mass/volume units were 1.463 g/ml at 23° C. and 1.284 g/ml at 145° C. The injection concentration was from 0.5 mg/ml to 2.0 mg/ml, with lower concentrations being used for higher molecular weight samples. Prior to running each sample the DRI detector and the viscometer were purged. The flow rate in the columns was then increased to 0.5 ml/minute, and the DRI was allowed to stabilize for 8 hours before injecting the first sample. The LS laser was turned on at least 1 to 1.5 hours before running the samples. The concentration, c, at each point in the chromatogram was calculated from the baseline-subtracted DRI signal, $I_{DRI}$, using the following equation:

$$c = K_{DRI} I_{DRI}/(dn/dc),$$

where $K_{DRI}$ is a constant determined by calibrating the DRI, and (dn/dc) is the incremental refractive index for the system. The refractive index "n" is 1.500 for TCB at 145° C. and 2λ, is 690 nm. Units of molecular weight are expressed in kg/mole or g/mole, and intrinsic viscosity is expressed in dL/g.

The LS detector was a Wyatt Technology High Temperature Dawn Heleos. The molecular weight, M, at each point in the chromatogram was determined by analyzing the LS output using the Zimm model for static light scattering (W. Burchard & W. Ritchering, "Dynamic Light Scattering from Polymer Solutions," in 80 PROGRESS IN COLLOID & POLYMER SCIENCE, 151-163 (Steinkopff, 1989)) and determined using the following equation:

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, "c" is the polymer concentration determined from the DRI analysis, $A_2$ is the second virial coefficient, P(θ) is the form factor for a mono-disperse random coil, and $K_o$ is the optical constant for the system, as set forth in the following equation:

$$K_o = \frac{4\pi^2 n^2 (dn/dc)^2}{\lambda^4 N_A},$$

where $N_A$ is Avogadro's number, and (dn/dc) is the incremental refractive index for the system, which takes the same value as the one obtained from DRI method, and the value of "n" is as above. The error in measuring the molecular weights give values of Mn, Mw and Mz that are ±5%.

A high temperature Viscotek Corporation viscometer, which has four capillaries arranged in a Wheatstone bridge configuration with two pressure transducers, was used to determine specific viscosity and branching. One transducer measures the total pressure drop across the detector, and the other, positioned between the two sides of the bridge, measures a differential pressure. The specific viscosity (ηs) for the solution flowing through the viscometer was calculated from their outputs. The intrinsic viscosity, [η], at each point in the chromatogram was calculated from the following equation:

$$\eta_s = c[\eta] + 0.3(c[\eta])^2,$$

where "c" is concentration and was determined from the DRI output. The average intrinsic viscosity, $[\eta]_{avg}$, of the sample was calculated using the following equation:

$$[\eta]_{avg} = \frac{\sum c_i [\eta]_i}{\sum c_i},$$

where the summations are over the chromatographic slices, i, between the integration limits. For data processing, the Mark-Houwink constants used were K=0.000579 and a=0.695.

The branching index (g'vis or simply g') is defined as the ratio of the intrinsic viscosity of the branched polymer to the intrinsic viscosity of a linear polymer of equal molecular weight and same composition. The branching index g' is defined mathematically as:

$$g' = \frac{[\eta]_{avg}}{k W_v^\alpha}.$$

The intrinsic viscosity of the linear polymer of equal molecular weight and same composition was calculated using the Mark-Houwink equation. For purposes of the present disclosure and claims thereto, α=0.695 and k=0.000579 for linear polyethylene homopolymers are used. Linear polyethylene homopolymer was used for g' calculation without considering the comonomer content. The $M_v$ is the viscosity-average molecular weight based on molecular weights determined by LS analysis.

SAOS and Shear Thinning. The Small Angle Oscillatory Spectroscopy (SAOS) method was used to measure shear rheology and shear thinning of the copolymer composition samples. Polymer samples were prepared using hot press (either a Carver Pres or Wabash Press) to make disks of 25 mm in diameter and 2.5 mm in thickness. In order to characterize the shear thinning behavior, a rheometer ARES-G2B (TA Instruments) was used to conduct small angle oscillatory shear measurements at angular frequency ranging from 0.01 to 500 rad/s at temperature 190° C. and at a fixed strain of 10%. The data was then converted into viscosity as a function of shear rate. To ensure that selected strain provides measurements within linear deformation range, the strain sweep measurements have been conducted (at angular frequency of 100 Hz). Data was processed using Trios software.

Extensional Rheology and Strain Hardening. To characterize strain hardening behavior of the polypropylene, the samples were tested using an Anton-Paar MCR 501 using a SER Universal Testing Platform (Xpansion Instruments, LLC), model SER2-P. The MCR 501 is a single head, stress-controlled rheometer. The samples were prepared using procedure described above (SAOS) and later cut into a rectangular shape with dimensions near 18 mm long and 12.7 mm wide. The measurements were conducted at Henky strain rates of 1, 5, 10 s−1 at a temperature of 190° C. In addition to the extensional test, samples are also tested using transient steady shear conditions and matched to the extensional data using a correlation factor of three. This provides the linear viscoelastic envelope (LVE). Data was processed using Trios software.

Sample Preparation. At room temperature, 0 wt % to 2 wt % of dicetyl peroxydicarbonate was added to a vessel containing a neat granular or a neat pellet form of the propylene-ethylene copolymer with other additives, without solvent, at room temperature and under inert atmosphere. The mixture was sent to a ZSK 30 mm twin screw extruder with underwater strand cut.

Testing Temperature. The temperature for extensional viscosity studies was set at 190° C. for copolymer composition testing. As for the Hencky strain rate in extensional, it was run at 1.0 s$^{-1}$, 5.0 s$^{-1}$ and 10.0 s$^{-1}$.

Melt Strength. The method used to measure the melt strength using the Rheotester 1000 capillary rheometer in combination with the Rheotens 71.97 (Göttfert) is described in established test method RHE04-3.3 ("Measurement of the elongational viscosity of molten polymers").

a) Test conditions: The conditions for testing melt strength/extensional viscosity using the Rheotens 71.97 in combination with the Rheotester 1000 are described in RHEO4-3.3:
1. Rheotester 1000:
   Temperature: 190° C.
   Die: 30/2
   Piston speed: 0.5 mm/s
   Shear rate: 72 sec'
2. Strand:
   Length: 122 mm
   Vo: 18 mm/s
3. Rheotens:
   Gap: 0.7 mm
   Wheels: grooved
   Acceleration: 12.0 mm/s$^2$ b) Testing: For each material, several measurements were performed. In fact, the complete amount of material present in the barrel of the Rheotester was extruded through the die and was being picked up by the rolls of the Rheotens. Once the strand is placed between the rolls, the roll speed was adjusted until a force of "zero" was measured. This beginning speed "Vs" was the speed of the strand through the nip of the wheels at the start of the test.

Once the test was started, the speed of the rolls was increased with a 12.0 mm/s$^2$ acceleration and the force was measured for each given speed. After each strand break, or strand slip between the rotors, the measurement was stopped and the material was placed back between the rolls for a new measurement. A new curve was recorded. Measuring continued until all material in the barrel was used.

c) Data treatment:
After testing, all the obtained curves are saved. Curves, which are out of line, are deactivated. The remaining curves, are cut at the same point at break or slip (maximum force measured), and are used for the calculation of a mean curve. The numerical data of this calculated mean curves are reported.

FIG. 1 is a graph illustrating Melt Flow Rate (MFR) data of compositions. Table 1 shows the different copolymers used for the MFR studies and the ethylene content of each copolymer. The starting MFR of the copolymer is around 8 g/10 min (2.16 kg, 230° C.). In FIG. 1, samples labelled with a 'G' had the base polymer in granular form. Samples without a 'G' were in pellet form. Granules or pellets of Vistamaxx™ 3588 propylene-based elastomer ("V3588"), Vistamaxx™ 3980 propylene-based elastomer ("V3980"), and Vistamaxx™ 3000 propylene-based elastomer ("V3000") were mixed with 1 wt %, 1.5 wt %, and 2 wt % of dicetylperoxydicarbonate, at room temperature. Each Vistamaxx™ 3588, Vistamaxx™ 3980, and Vistamaxx™ 3000 propylene-based elastomer, granules and pellets, held an initial MFR of 8 g/10 min before reaction. An overall decrease of all MFRs occurred after mixing with the dicetylperoxydicarbonate. MFRs dropped markedly depending on a) the amount of dicetylperoxydicarbonate added; b) if dicetylperoxydicarbonate was added to pellet or granular forms of the copolymer, c) if ethylene content of Vistamaxx™ propylene-based elastomer is high. Indeed, copolymer granules were most effective as compared to their corresponding pellet forms, likely due to the larger surface area for the reaction with peroxide to occur. For instance, when V3588 pellet was mixed with 1.5 wt % of dicetylperoxydicarbonate, MFR decreased from 8 g/10 min to 6.5 g/10 min. MFR dropped even more to 3.5 g/10 min when V3588 granule ("G V3588") was mixed under the same conditions. The same trend was observed for V3980 pellet mixed with 1.5% of dicetylperoxydicarbonate (MFR value of 6.2 g/10 min) and V3980 granule ("G V3980") mixed with 1.5% of dicetylperoxydicarbonate (MFR value of 3.1 g/10 min). The lowest MFR value of 1.5 g/10 min was obtained when V3000 granule ("G V3000"), which has the highest ethylene content of 11 wt %, was mixed with 1.5 wt % of dicetylperoxydicarbonate. When ethylene content of the copolymer was higher, MFR values decreased. Without being bound by theory, it is believed the MFR values decreased due to the presence of ethylene in the backbone of the copolymer, in addition to the fact that the copolymer crosslinked with free radicals present during the reaction.

TABLE 1

| Copolymer | Base MFR 230° C./2.16 kg (g/10 min) | Ethylene content (wt %) (EMCC method) |
|---|---|---|
| V3588 | 8 | 4 |
| V3980 | 8 | 9 |
| V3000 | 8 | 11 |

In addition to a drop in MFR with a higher ethylene content, it was also observed that the strain hardening behavior and melt strength of the copolymer increases. These two characteristics are generally favorable for foam applications.

Figure 2:
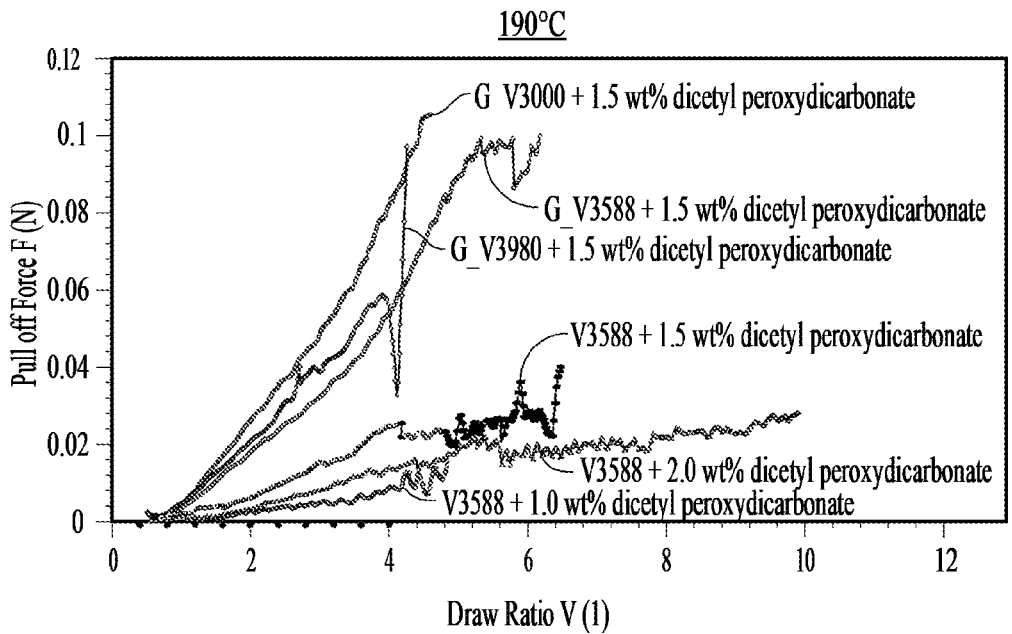
FIG. 2 is a graph illustrating an extensional viscosity plot of pull-off force (melt strength) as a function of draw ratio of compositions, according to any embodiment.

FIG. 2 is a graph illustrating an extensional viscosity plot of pull-off force (melt strength) as a function of draw ratio of compositions. (Please note: measure of melt strength at 190° C. for V3588 without any dicetyl peroxydicarbonate was not obtained). The balanced melt strength copolymer granules, such as G V3588, G V3980, and G V3000 mixed with 1.5 wt % of dicetylperoxydicarbonate have the highest melt strength and a draw ratio (an indication of extensional flow capability), as shown in FIG. 2. Results of the experiment show as well that a higher ethylene content of the copolymer granules provided a higher melt strength of the products.

Figure 3:
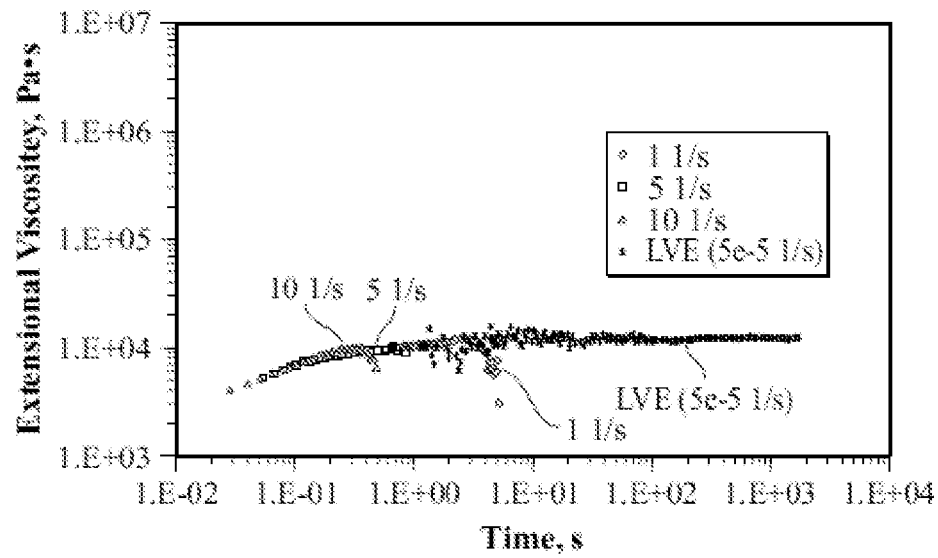
FIG. 3 is a graph illustrating an extensional viscosity (Pass) as a function of time (sec) for a composition formed from Vistamaxx™ 3588 propylene-based elastomer as a pellet and 0 wt % dicetyl peroxydicarbonate at three shear rates at 190° C., according to any embodiment.

FIG. 3 is a graph illustrating an extensional viscosity (Pass) as a function of time (sec) for a composition formed from Vistamaxx™ 3588 as a pellet and 0 wt % dicetyl peroxydicarbonate at three shear rates at 190° C.

Figure 4:
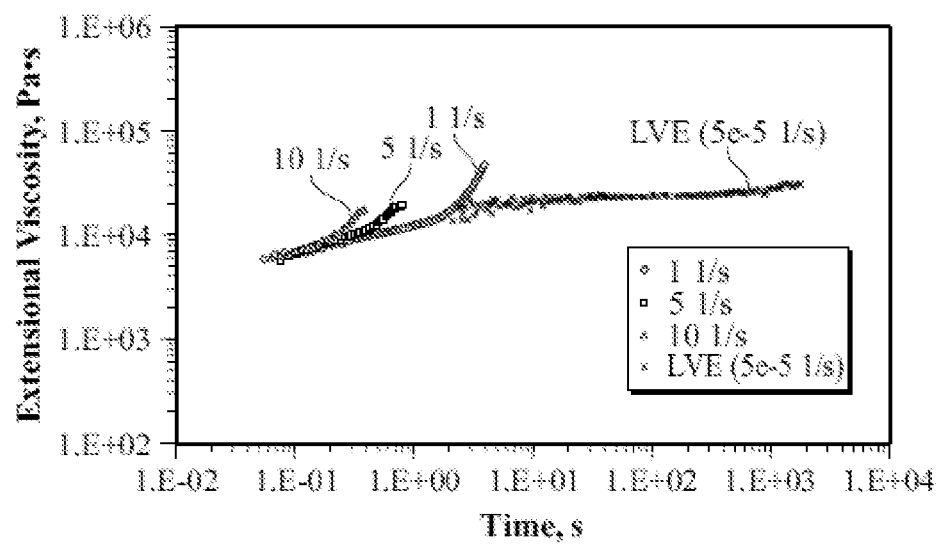
FIG. 4 is a graph illustrating an extensional viscosity (Pass) as a function of time (sec) for a composition formed from Vistamaxx™ 3588 propylene-based elastomer as a pellet and 1 wt % dicetyl peroxydicarbonate disclosed herein at three shear rates at 190° C., according to to any embodiment.

FIG. 4 is a graph illustrating an extensional viscosity (Pass) as a function of time (sec) for a composition formed from Vistamaxx™ 3588 as a pellet and 1 wt % dicetyl peroxydicarbonate disclosed herein at three shear rates at 190° C. The resulting copolymer composition pellet presented an extensional viscosity value of from 4,000 Pa·s to 45,000 Pa·s.

Figure 5:
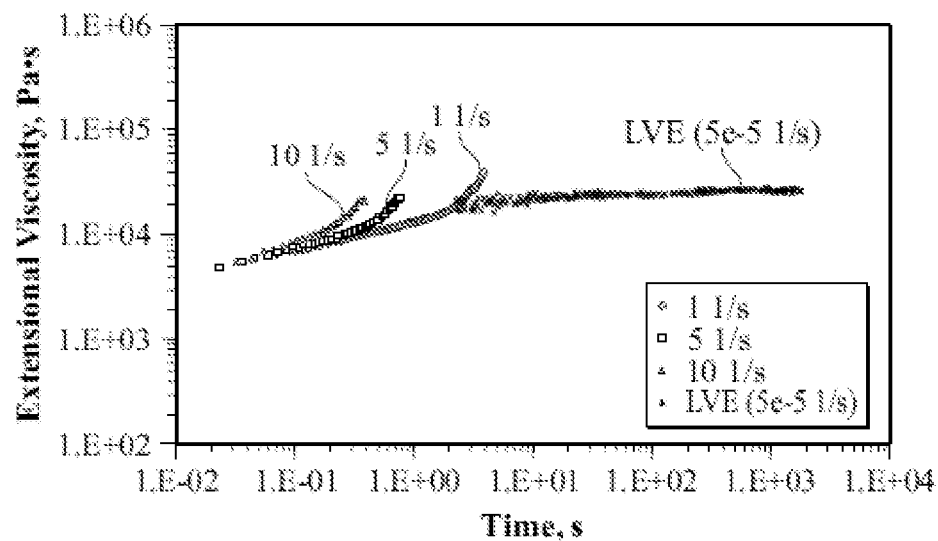
FIG. 5 is a graph illustrating extensional viscosity (Pass) as a function of time (sec) for a composition formed from Vistamaxx™ 3588 propylene-based elastomer as a pellet and 2 wt % dicetyl peroxydicarbonate disclosed herein at three shear rates at 190° C., according to any embodiment.

FIG. 5 is a graph illustrating extensional viscosity (Pa·s) as a function of time (sec) for a composition formed from Vistamaxx™ 3588 as a pellet and 2 wt % dicetyl peroxydicarbonate disclosed herein at three shear rates at 190° C. The resulting LCB copolymer composition pellet presented an extensional viscosity value of from 5,000 Pa·s to 40,000 Pa·s.

At its original state, V3588 pellet presents an extensional viscosity value of from 4,000 Pa·s to 10,000 Pa·s. According to the results obtained with the pellet forms of V3588, increasing the amount of the organic peroxide induced an increase of the extensional viscosity (FIGS. 3-5).

Figure 6:
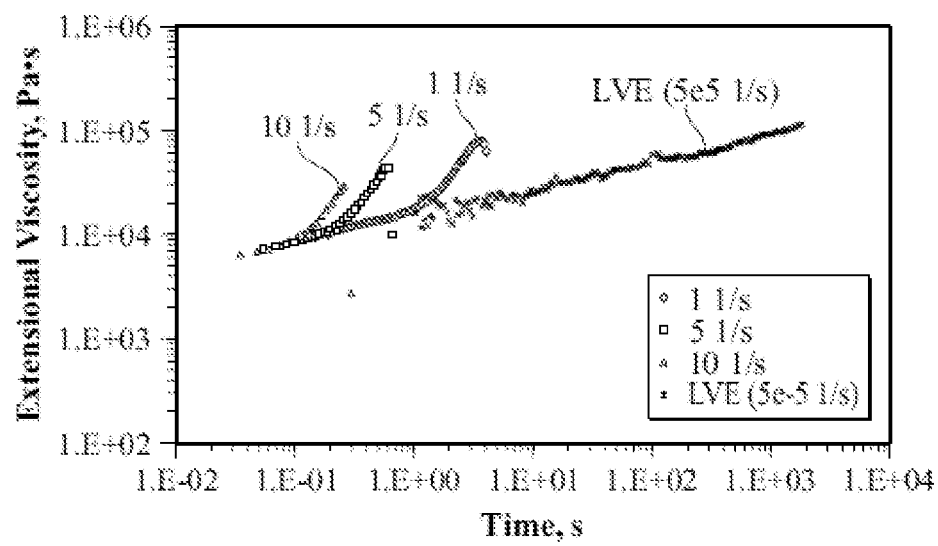
FIG. 6 is a graph illustrating extensional viscosity (Pass) as a function of time (sec) for a composition formed from Vistamaxx™ 3588 propylene-based elastomer as a granule and 1.5 wt % dicetyl peroxydicarbonate at three shear rates at 190° C., according to any embodiment.

FIG. 6 is a graph illustrating extensional viscosity (Pa·s) as a function of time (sec) for a composition formed from Vistamaxx™ 3588 as a granule and 1.5 wt % dicetyl peroxydicarbonate at three shear rates at 190° C. The resulting copolymer composition pellet presented an extensional viscosity value of from 6,000 Pa·s to 100,000 Pa·s.

Figure 7:
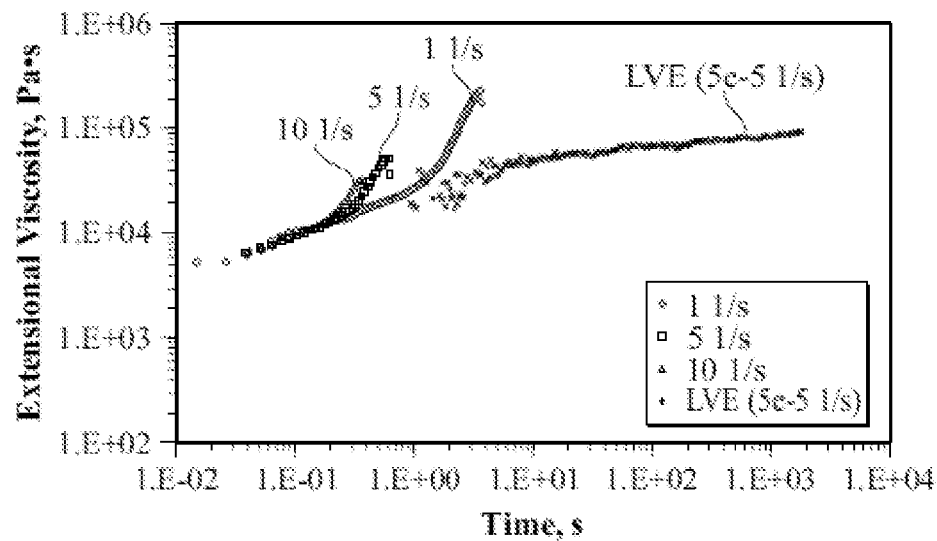
FIG. 7 is a graph illustrating extensional viscosity (Pass) as a function of time (sec) for a composition formed from Vistamaxx™ 3980 propylene-based elastomer as a granule and 1.5 wt % dicetyl peroxydicarbonate at three shear rates at 190° C., according to any embodiment.

FIG. 7 is a graph illustrating extensional viscosity (Pa·s) as a function of time (sec) for a composition formed from Vistamaxx™ 3980 as a granule and 1.5 wt % dicetyl peroxydicarbonate at three shear rates at 190° C. The resulting copolymer composition pellet presented an extensional viscosity value of from 5,000 Pa·s to 220,000 Pa·s.

Figure 8:
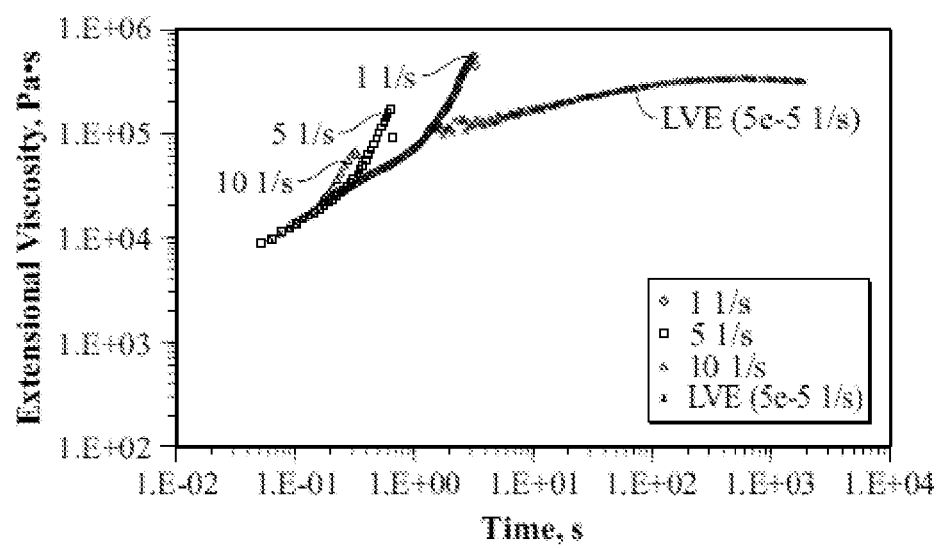
FIG. 8 is a graph illustrating extensional viscosity (Pa·s) as a function of time (sec) for a composition formed from Vistamaxx™ 3000 propylene-based elastomer as a granule and 1.5 wt % dicetyl peroxydicarbonate at three shear rates at 190° C., according to any embodiment.

FIG. 8 is a graph illustrating extensional viscosity (Pa·s) as a function of time (sec) for a composition formed from Vistamaxx™ 3000 as a granule and 1.5 wt % dicetyl peroxydicarbonate at three shear rates at 190° C. The resulting copolymer composition pellet presented an extensional viscosity value of from 8,000 Pa·s to 600,000 Pa·s. Such high level of strain hardening implies that chain branching and crosslinking occurred.

Moreover, according to the results obtained with the granule forms of V3588, V3980, and V3000 at a constant amount of dicetylperoxydicarbonate (1.5 wt %) (FIGS. 6-8), values of the extensional viscosity increased above the linear viscoelastic (LVE) curve.

Table 2 summarizes the run conditions, instrument and polymer parameters (analyzed as ethylene-propylene copolymer with 96 wt % comonomer) for the different compositions formed under the conditions described as follows (Conditions 1-5):

Condition 1 (Composition 1): Vistamaxx™ 3588 as a pellet (V3588) and 0 wt % dicetyl peroxydicarbonate.
Condition 2 (Composition 2): Vistamaxx™ 3588 as a pellet (V3588) and 1.0 wt % dicetyl peroxydicarbonate.
Condition 3 (Composition 3): Vistamaxx™ 3588 as a pellet (V3588) and 1.5 wt % dicetyl peroxydicarbonate.
Condition 4 (Composition 4): Vistamaxx™ 3588 as a pellet (V3588) and 2.0 wt % dicetyl peroxydicarbonate.
Condition 5 (Composition 5): Vistamaxx™ 3588 (G V3588) as a granule and 1.5 wt % dicetyl peroxydicarbonate.

TABLE 2

| Parameters | Condition 1 | Condition 2 | Condition 3 | Condition 4 | Condition 5 |
|---|---|---|---|---|---|
| Inject Mass (mg) | 0.3126 | 0.1925 | 0.2219 | 0.2072 | 0.2393 |
| Calculated Mass (mg) | 0.305 (97.5%) | 0.183 (94.9%) | 0.22 (99.1%) | 0.203 (97.9%) | 0.243 (101.4%) |
| Adjusted Flow Rate (ml/min) | 0.532 | 0.533 | 0.533 | 0.533 | 0.533 |
| Column Cal. C0 | 14.109 | 14.109 | 14.109 | 14.109 | 14.109 |
| Column Cal. C1 | 0.47163 | 0.47163 | 0.47163 | 0.47163 | 0.47163 |
| Column Cal. C2 | 0.0012771 | 0.0012771 | 0.0012771 | 0.0012771 | 0.0012771 |
| Column Cal. C3 | 0 | 0 | 0 | 0 | 0 |
| Inject Mark (mL) | 31.814 | 31.814 | 31.814 | 31.814 | 31.814 |
| Vistaion BI | 1.02 | 0.968 | 0.971 | 0.953 | 0.84 |
| Linear Zimm Analysis | | | | | |
| A2 (Input Value) | 0.00054 | 0.00054 | 0.0006 | 0.0006 | 0.0005 |
| (dn/dc) | 0.1048 | 0.1048 | 0.1048 | 0.1048 | 0.1048 |
| LS to DRI (mL) | 0.2 | 0.2 | 0.2 | 0.2 | 0.2 |
| LS to Vis. (mL) | 0.39 | 0.39 | 0.39 | 0.39 | 0.39 |
| K (sample) | 0.00024374 | 0.00024374 | 0.00024374 | 0.00024374 | 0.00024374 |
| Alpha (sample) | 0.704 | 0.704 | 0.704 | 0.704 | 0.704 |
| LS Calib. Const. | 4.613e−05 | 4.613e−05 | 4.613e−05 | 4.613e−05 | 4.613e−05 |
| DRI Const. | 0.0002693 | 0.0002693 | 0.0002693 | 0.0002693 | 0.0002693 |
| DP Const. | 0.6303 | 0.6303 | 0.6303 | 0.6303 | 0.6303 |
| IP Gain | 23.27 mV/KPa | 23.27 mV/KPa | 23.27 mV/KPa | 23.27 mV/KPa | 23.27 mV/KPa |

K and alpha are Mark-Houwink equation parameters;
dn/dc units = (ml/g)

Table 3 illustrates comparative results obtained from the Multi Angle Light Scattering (MALLS) 3D-GPC (DRI) intrinsic viscosity studies for the different compositions formed under the conditions described above (Conditions 1-5).

As shown in Tables 3 and 4, under condition 1, Composition 1 (V3588 pellet) has an $Mw_{MALLS}$ of 203,146 g/mol, a PDI of 2.17, $Mz_{MALLS}/Mw_{MALLS}$ of 1.46, an $Mn_{DRI}$ of 103,508 g/mol, an $Mz_{MALLS}/Mn$ ($MWD_{MALLS}$) of 2.52, an $Mw_{MALLS}/Mn$ of 1.72, a [η] of 1.269 dL/g, and a g'vis of 1.00. Treatment with an increased concentration of dicetylperoxydicarbonate, as well as the ethylene content of the Vistamaxx™, especially under granular form, induced an increase of the molecular weight of the resulting copolymer composition pellets and a decrease of the g'vis, which is consistent with the presence of higher branching as depicted in FIGS. 10-13. Treatment of V3588 pellet with 1.0 wt % dicetyl peroxydicarbonate (condition 2) provided a copolymer composition with an $Mw_{MALLS}$ of 229,704 g/mol, a PDI of 2.35, $Mz_{MALLS}/Mw_{MALLS}$ of 1.79, an $Mn_{DRI}$ of 96,068 g/mol, an $Mz_{MALLS}/Mn$ ($MWD_{MALLS}$) of 3.58, an $Mw_{MALLS}/Mn$ of 2.00, a [η] of 1.331 dL/g, and a g'vis of 0.978. Under condition 3, treatment of V3588 pellet with 1.5 wt % dicetyl peroxydicarbonate provided a copolymer composition with an $Mw_{MALLS}$ of 220,832 g/mol, a PDI of 2.08, $Mz_{MALLS}/Mw_{MALLS}$ of 1.65, an $Mn_{DRI}$ of 108,177 g/mol, an $Mz_{MALLS}/Mn$ ($MWD_{MALLS}$) of 3.11, an $Mw_{MALLS}/Mn$ of 1.88, a [η] of 1.285 dL/g, and a g'vis of 0.973. Treatment of V3588 pellet with 2.0 wt % dicetyl peroxydicarbonate (condition 4) provided a copolymer composition with an $Mw_{MALLS}$ of 224,880 g/mol, a PDI of 2.09, $Mz_{MALLS}/Mw_{MALLS}$ of 1.57, an $Mn_{DRI}$ of 116,596 g/mol, an $Mz_{MALLS}/Mn$ ($MWD_{MALLS}$) of 2.87, an $Mw_{MALLS}/Mn$ of 1.83, a [η] of 1.286 dL/g, and a g'vis of 0.951. In addition, under condition 5, treatment of V3588 granule "G V3588" with 1.5 wt % dicetyl peroxydicarbonate provided a copolymer composition with an $Mw_{MALLS}$ of 292,712 g/mol, a PDI of 2.36, $Mz_{MALLS}/Mw_{MALLS}$ of 2.61, an $Mn_{DRI}$ of 117,448 g/mol, an $Mz_{MALLS}/Mn$ ($MWD_{MALLS}$) of 5.84, an $Mw_{MALLS}/Mn$ of 2.24, a [η] of 1.401 dL/g, and a g'vis of 0.894.

TABLE 3

| Composition | $Mn_{MALLS}$ (g/mol) | $Mw_{MALLS}$ (g/mol) | $Mz_{MALLS}$ (g/mol) | $Mv_{LS}$ (g/mol) | [η] (dL/g) | g' (vis average) | g' (Z average) |
|---|---|---|---|---|---|---|---|
| 1 | 117,554 | 203,146 | 296,850 | 189,739 | 1.269 | 1.001 | 1 |
| 2 | 114,700 | 229,704 | 410,686 | 209,915 | 1.331 | 0.978 | 0.964 |
| 3 | 117,175 | 220,832 | 364,216 | 203,595 | 1.295 | 0.973 | 0.947 |
| 4 | 122,910 | 224,880 | 353,121 | 208,073 | 1.286 | 0.951 | 0.917 |
| 5 | 130,664 | 292,712 | 762,674 | 256,604 | 1.401 | 0.894 | 0.771 |

Table 4 illustrates comparative results obtained from the Gel Permeation Chromatography using a Differential Refractometer [GPC (DRI)] studies for the different compositions formed under the conditions described above (Conditions 1-5).

TABLE 4

| Composition | $Mn_{DRI}$ (g/mol) | $Mw_{DRI}$ (g/mol) | $Mz_{DRI}$ (g/mol) | $Mw_{DRI}/Mn_{DRI}$ (g/mol) |
|---|---|---|---|---|
| 1 | 103,508 | 224,577 | 374,046 | 2.17 |
| 2 | 96,068 | 225,928 | 379,777 | 2.35 |
| 3 | 108,177 | 225,306 | 389,969 | 2.08 |
| 4 | 116,596 | 243,571 | 469,412 | 2.09 |
| 5 | 117,448 | 276,931 | 568,652 | 2.36 |

Table 5 illustrates comparative results obtained from the normalized DRI, LS and viscometer chromatograms as a function of retention volume (ml) for the different compositions formed under the conditions described above (Conditions 1-5).

TABLE 5

| Composition | Integration limits | Intrinsic Viscosity limits | DRI | LS | Differential Pressure |
|---|---|---|---|---|---|
| 1 | 16.78 to 23.23 | 17.52 to 20.87 | (12.35, 0) to (24.24, 0) | (11.79, 0.3) to (30.47, 0.3) | (8.22, 0.03) to (41.32, 0.03) |
| 2 | 16.91 to 23.61 | 17.67 to 20.89 | (25.51, 0.01) to (8.68, 0.01) | (13.64, 0.3) to (24.15, 0.3) | (13.3, 0.01) to (27.67, 0.01) |
| 3 | 16.39 to 22.57 | 17.79 to 20.97 | (16.59, 0.01) to (23.18, 0.01) | (14.44, 0.3) to (23.36, 0.3) | (15.16, 0.01) to (28.51, 0.01) |
| 4 | 16.3 to 22.13 | 17.67 to 20.69 | (16.07, 0.01) to (22.7, 0.01) | (14.2, 0.3) to (23.03, 0.3) | (14.11, 0.01) to (40.69, 0.01) |
| 5 | 16.16 to 22.57 | 17.25 to 20.99 | (25.66, 0) to (13.46, 0) | (14.32, 0.3) to (23.17, 0.3) | (12.54, 0.01) to (42.24, 0.01) |

Figure 9A:
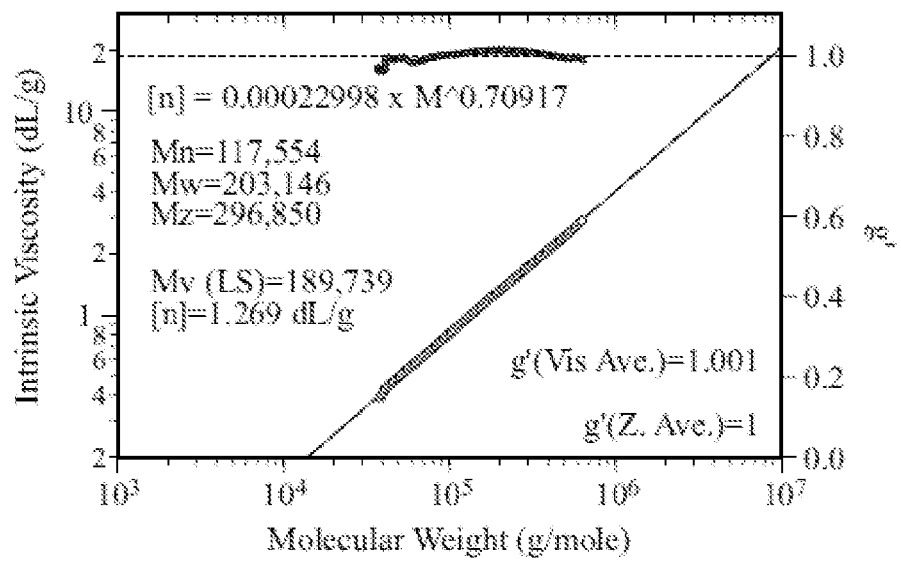
FIG. 9A is a graph illustrating Multi Angle Light Scattering (MALLS) 3D-GPC (DRI) intrinsic viscosity traces for a composition formed from Vistamaxx™ 3588 propylene-based elastomer as a pellet and 0 wt % dicetyl peroxydicarbonate, according to any embodiment.
Figure 9B:
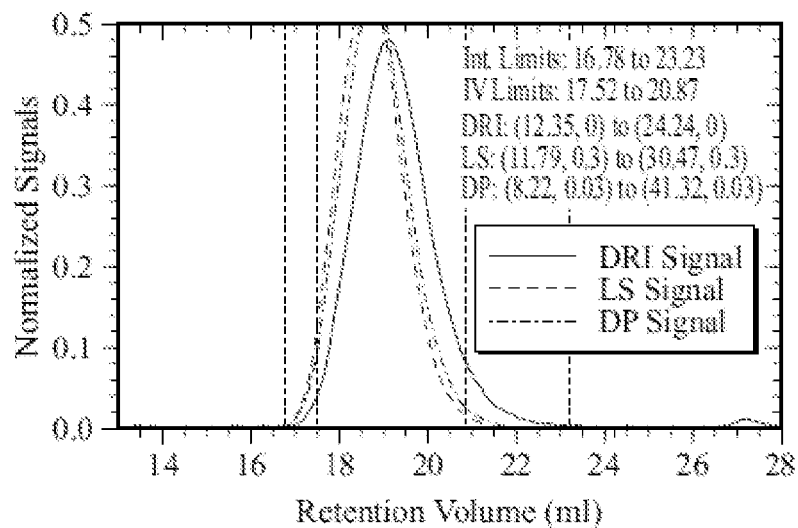
FIG. 9B is a graph illustrating a normalized DRI, LS and viscometer chromatograms as a function of retention volume (ml) for a composition formed from Vistamaxx™ 3588 propylene-based elastomer as a pellet and 0 wt % dicetyl peroxydicarbonate, according to any embodiment.
Figure 9C:
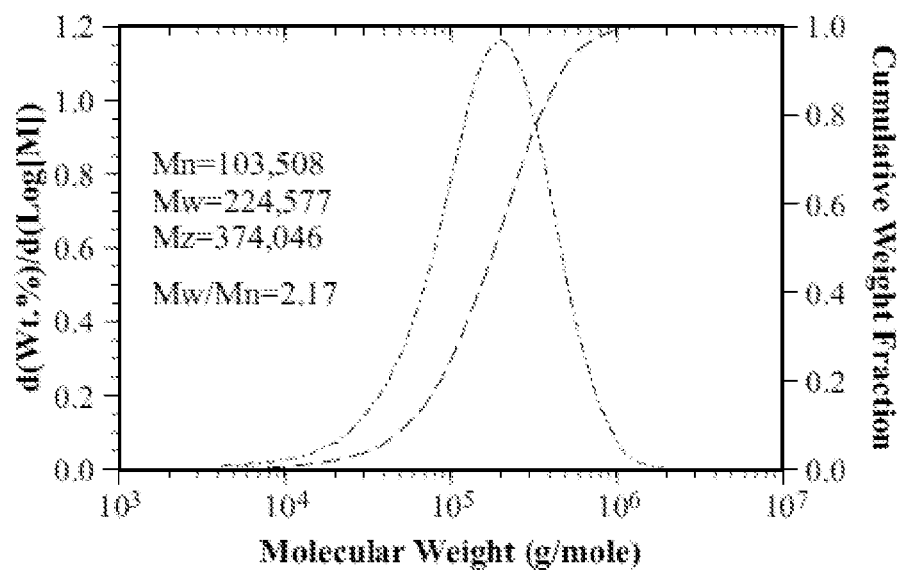
FIG. 9C is a graph illustrating Gel Permeation Chromatography using a Differential Refractometer [GPC (DRI)] traces for a composition formed from Vistamaxx™ 3588 propylene-based elastomer as a pellet and 0 wt % dicetyl peroxydicarbonate, according to any embodiment.

FIG. 9A is a graph illustrating Multi Angle Light Scattering (MALLS) 3D-GPC (DRI) intrinsic viscosity traces for a composition formed from Vistamaxx™ 3588 as a pellet and 0 wt % dicetyl peroxydicarbonate. FIG. 9B is a graph illustrating a normalized DRI, LS and viscometer chromatograms as a function of retention volume (ml) for a composition formed from Vistamaxx™ 3588 as a pellet and 0 wt % dicetyl peroxydicarbonate. FIG. 9C is a graph illustrating Gel Permeation Chromatography using a Differential Refractometer [GPC (DRI)] traces for a composition formed from Vistamaxx™ 3588 as a pellet and 0 wt % dicetyl peroxydicarbonate.

Figure 10A:
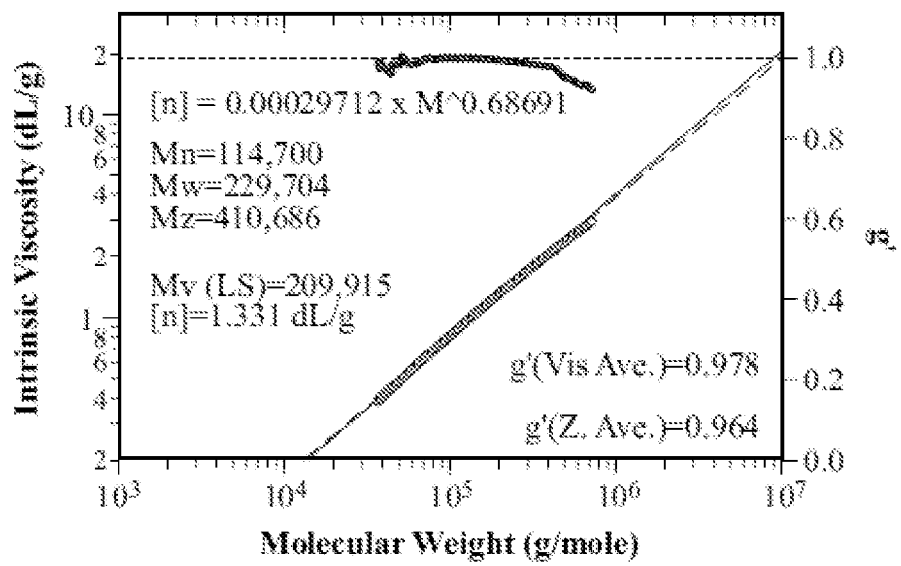
FIG. 10A is a graph illustrating MALLS 3D-GPC (DRI) intrinsic viscosity traces for a composition formed from Vistamaxx™ 3588 a propylene-based elastomer s a pellet and 1.0 wt % dicetyl peroxydicarbonate, according to any embodiment.
Figure 10B:
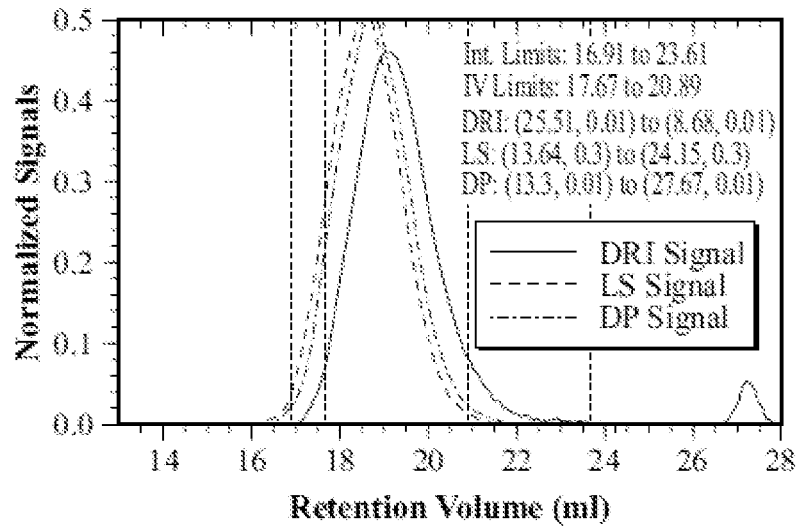
FIG. 10B is a graph illustrating a normalized DRI, LS and viscometer chromatograms as a function of retention volume (ml) for a composition formed from Vistamaxx™ 3588 to propylene-based elastomer as a pellet and 1.0 wt % dicetyl peroxydicarbonate, according to any embodiment.
Figure 10C:
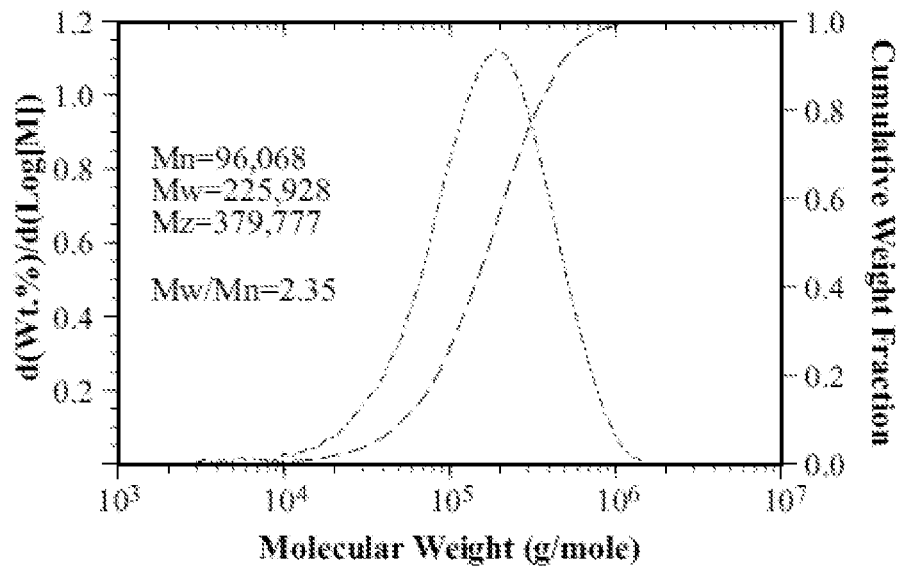
FIG. 10C is a graph illustrating Gel Permeation Chromatography using Differential Refractometer [GPC (DRI)] traces for a composition formed from Vistamaxx™ 3588 as a pellet and 1.0 wt % dicetyl peroxydicarbonate, according to any embodiment.

FIG. 10A is a graph illustrating MALLS 3D-GPC (DRI) intrinsic viscosity traces for a composition formed from Vistamaxx™ 3588 as a pellet and 1.0 wt % dicetyl peroxydicarbonate. FIG. 10B is a graph illustrating a normalized DRI, LS and viscometer chromatograms as a function of retention volume (ml) for a composition formed from Vistamaxx™ 3588 as a pellet and 1.0 wt % dicetyl peroxydicarbonate. FIG. 10C is a graph illustrating Gel Permeation Chromatography using Differential Refractometer [GPC (DRI)] traces for a composition formed from Vistamaxx™ 3588 as a pellet and 1.0 wt % dicetyl peroxydicarbonate.

Figure 11:
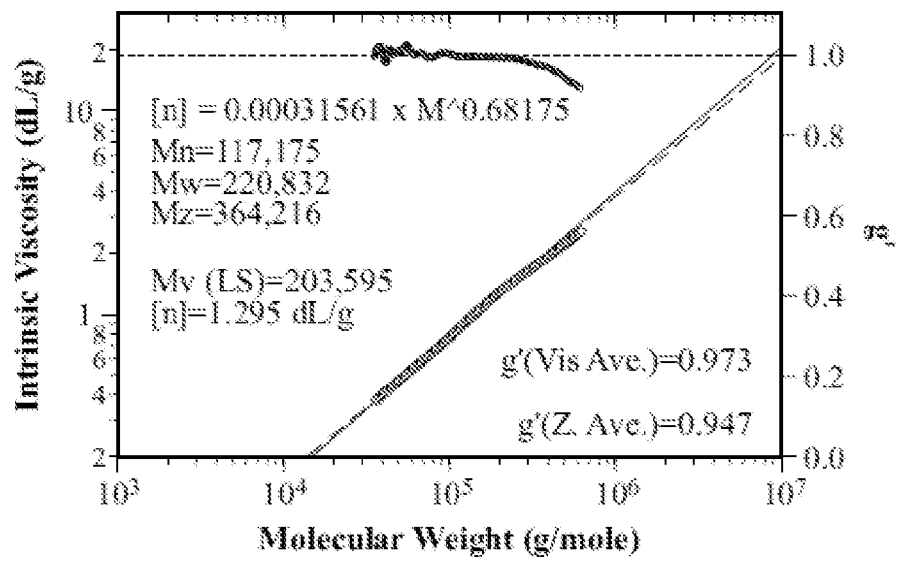
FIG. 11 is a graph illustrating MALLS 3D-GPC (DRI) intrinsic viscosity traces for a composition formed from Vistamaxx™ 3588 propylene-based elastomer as a pellet and 1.5 wt % dicetyl peroxydicarbonate, according to any embodiment.

FIG. 11 is a graph illustrating MALLS 3D-GPC (DRI) intrinsic viscosity traces for a composition formed from Vistamaxx™ 3588 as a pellet and 1.5 wt % dicetyl peroxydicarbonate.

Figure 12:
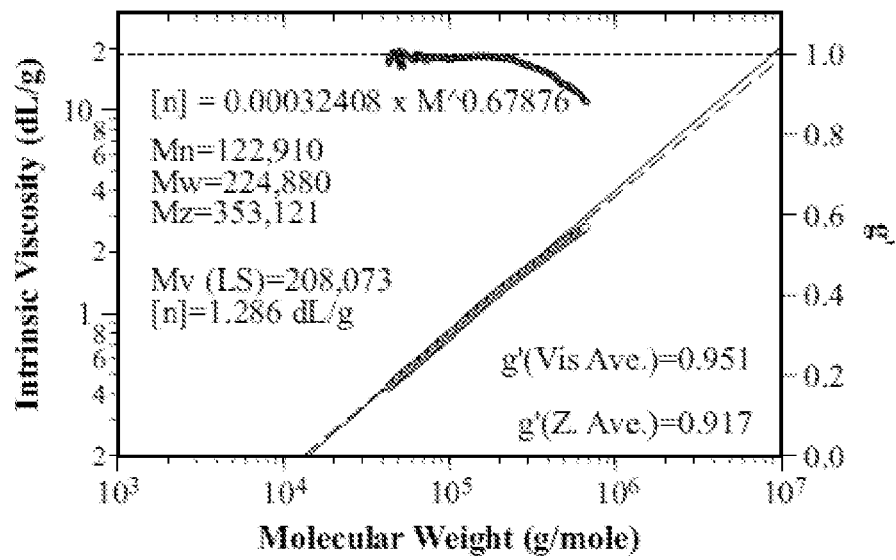
FIG. 12 is a graph illustrating MALLS 3D-GPC (DRI) intrinsic viscosity traces for a composition formed from Vistamaxx™ 3588 propylene-based elastomer as a pellet and 2.0 wt % dicetyl peroxydicarbonate, according to any embodiment.

FIG. 12 is a graph illustrating MALLS 3D-GPC (DRI) intrinsic viscosity traces for a composition formed from Vistamaxx™ 3588 as a pellet and 2.0 wt % dicetyl peroxydicarbonate.

Figure 13:
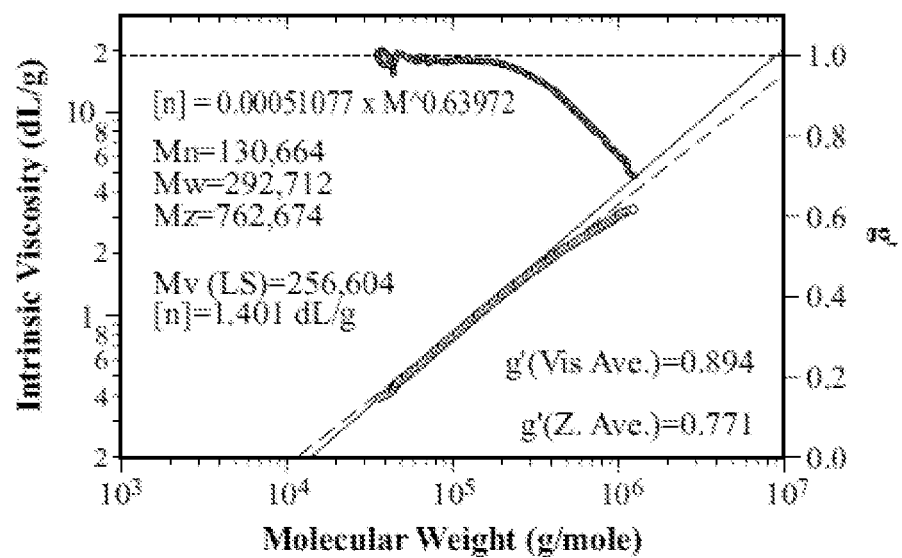
FIG. 13 is a graph illustrating MALLS 3D-GPC (DRI) intrinsic viscosity traces for a composition formed from Vistamaxx™ 3588 propylene-based elastomer as a granule and 1.5 wt % dicetyl peroxydicarbonate, according to any embodiment.

FIG. 13 is a graph illustrating MALLS 3D-GPC (DRI) intrinsic viscosity traces for a composition formed from Vistamaxx™ 3588 as a granule and 1.5 wt % dicetyl peroxydicarbonate.

Figure 14:
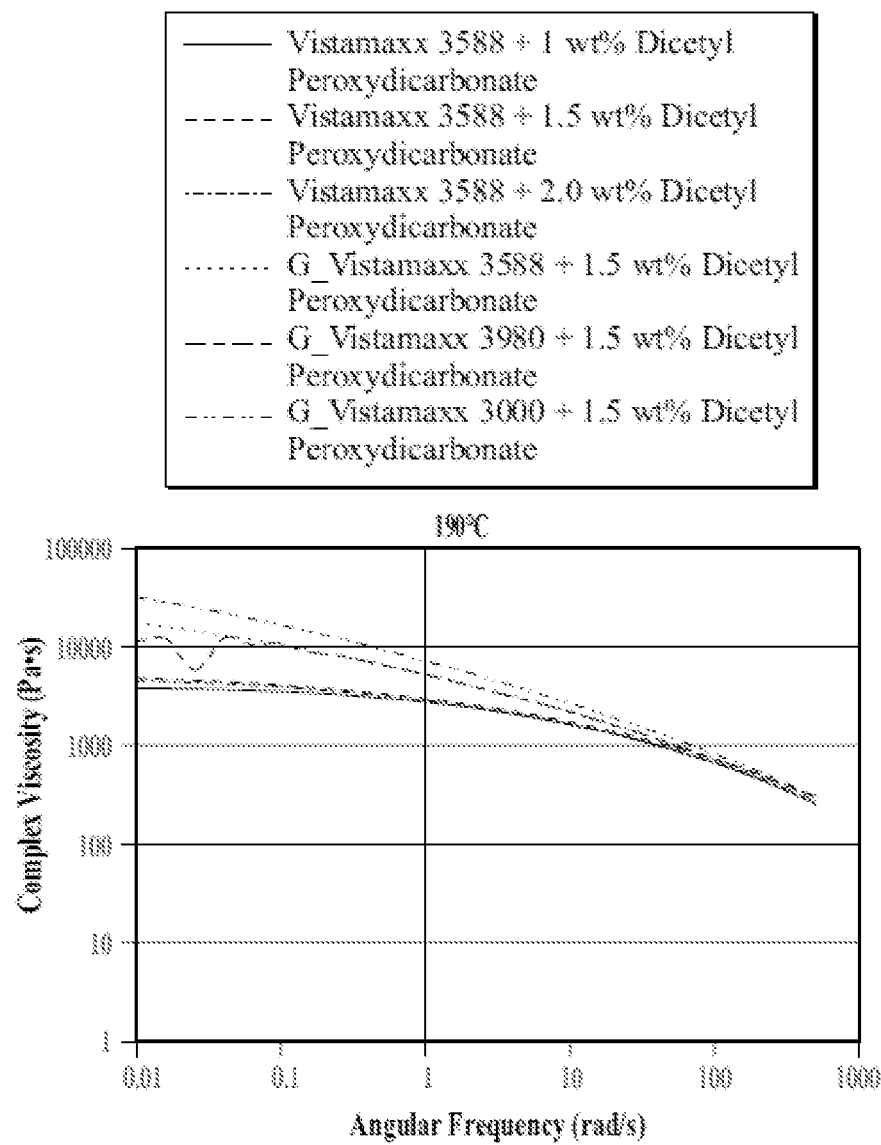
FIG. 14 is a graph illustrating complex viscosity (Pa·s) as a function of Angular Frequency of the Oscillatory Shear Rheological measurements of comparative compositions and compositions formed from Vistamaxx™ propylene-based elastomer as a pellet or granule for various amounts of dicetyl peroxydicarbonate (190° C.), according to any embodiment.

FIG. 14 is a graph illustrating complex viscosity (Pa·s) as a function of Angular Frequency of the Oscillatory Shear Rheological measurements of comparative compositions and compositions formed from Vistamaxx™ as a pellet or granule for various amounts of dicetyl peroxydicarbonate (190° C.). The viscosity curves from the oscillatory shear rheology testing performed at 190° C. were consistent with the MFR observations. Vistamaxx™ 3980 granules extruded with 1.5 wt % of dicetylperoxydicarbonate at 190° C. has the highest, steepest and the longest complex viscosity curve indicative of the most shear thinning of the samples tested. According to the results obtained for this study, the shear thinning effect seems to be stronger when granules are mixed with the organic peroxide, and when compared to the pellets, as well as when the ethylene content on the copolymer is higher than a comparative copolymer having lower ethylene content. As more long chain branching appears, the angular frequency decreases and the shear thinning increases.

Overall, polymer compositions and methods of the present disclosure provide polymer compositions having high melt strength and strain hardening amenable to form commercially viable foamed articles.

As it relates to a process, the phrase "consisting essentially of" means that there are no other process features, solvents, temperature changes, or mechanical manipulations that will alter the claimed properties of the polymer, polymer blend or article produced therefrom by any more than 10, 15 or 20%, but there may otherwise be other process features not named.

For all jurisdictions in which the doctrine of "incorporation by reference" applies, all of the test methods, patent publications, patents and reference articles are hereby incorporated by reference either in their entirety or for the relevant portion for which they are referenced.

While the present disclosure has been described with respect to a number of embodiments and examples, those skilled in the art, having benefit of this disclosure, will appreciate that other embodiments can be devised which do not depart from the scope and spirit of the present disclosure.

The invention claimed is:
1. A composition comprising the product of:
a copolymer comprising at least 50 mol % propylene and at least 1 wt % of at least one of ethylene or a $C_4$ to $C_{10}$ α-olefin, based on the total weight of the copolymer, the copolymer having $Mw_{MALLS}/Mn_{MALLS}$ of from 1 to 5; and
an organic peroxide;
wherein the product is a melt blend of a homogenized mixture,
wherein the homogenized mixture comprises:
solid particles of the copolymer, wherein the solid particles are granules having a diameter of from 100 micrometers to 2,000 micrometers; and
a decomposition product of the organic peroxide,
wherein the product comprises the copolymer crosslinked by the organic peroxide, and
wherein the product has the following:
a peak extensional viscosity (strain rate: 1 sec$^{-1}$ to 10 sec$^{-1}$, 190° C.) of from 1×10$^3$ Pa·s to 1×10$^6$ Pa·s; and
a $Mw_{MALLS}/Mn_{MALLS}$ of from 1.6 to 2.5.

2. The composition of claim 1, wherein the copolymer comprises from 1 wt % to 15 wt % ethylene, based on the total weight of the polymer, and wherein the product has the following:
a peak extensional viscosity (strain rate at 1 sec$^{-1}$, 190° C.) of from 1×10$^4$ Pa·s to 1×10$^6$ Pa·s.

3. The composition of claim 1, wherein the product or the composition is a pellet.

4. The composition of claim 3, wherein the pellet has a diameter of greater than 1,000 micrometers.

5. The composition of claim 1, wherein the copolymer comprises from 5 wt % to 16 wt % ethylene, based on the total weight of the polymer, and wherein the product has the following: a peak extensional viscosity (strain rate 1 sec$^{-1}$, 190° C.) of 1×10$^5$ Pa·s to 1×10$^6$ Pa·s.

6. The composition of claim 1, wherein the copolymer comprises from 0.01 wt % to 5 wt %, based on the total weight of the copolymer, of a $C_4$ to $C_{10}$ α-olefin selected from dicyclopentadiene, 1,3-cyclopentadiene, divinylbenzene, 1,4-hexadiene, 1,4-cyclohexadiene, 1,5-hexadiene, 5-methyl-1,4-hexadiene, 1,6-octadiene, 1,7-octadiene, 3,7-dimethyl-1,6-octadiene, 1,9-decadiene, 1,13-tetradecadiene, 5-methylene-2-norbornene, 5-ethylidene-2-norbornene, 5-vinyl-2-norbornene, or a combination thereof.

7. The composition of claim 1, wherein the propylene of the copolymer has an isotactic triad fraction of 50% to 99%, as measured by $^{13}$C NMR.

8. The composition of claim 1, wherein the copolymer has an Mw, by DRI analysis, of from 50,000 g/mole to 400,000 g/mole; an Mn, by DRI analysis, of from 25,000 g/mole to 200,000 g/mole; and an Mz, by DRI analysis, of from 100,000 g/mole to 500,000 g/mole.

9. The composition of claim 1, wherein the organic peroxide is selected from compounds represented by one or more structures selected from (a) and (b):

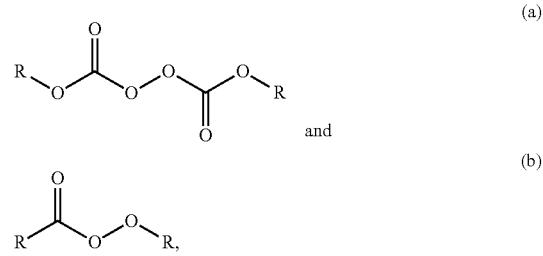

wherein each R group is independently selected from hydrogen, $C_1$ to $C_{30}$ alkyls, $C_7$ to $C_{34}$ alkylaryls, $C_7$ to $C_{34}$ arylalkyls, and substituted versions thereof.

10. The composition of claim 1, wherein the organic peroxide is selected from di-sec-butyl peroxydicarbonate, diisopropyl peroxydicarbonate, dicyclohexyl peroxydicarbonate, di(4-tert-butylcyclohexyl) peroxydicarbonate, dicetyl peroxydicarbonate, dibutyl peroxydicarbonate, di(2-ethylhexyl) peroxydicarbonate, didodecyl peroxydicarbonate, diicosyl peroxydicarbonate, and ditetracosyl peroxydicarbonate.

11. The composition of claim 1, wherein the composition comprises the product of from 0.01 wt % to 3 wt % of the organic peroxide, based on the weight of the product.

12. The composition of claim 1, wherein the composition comprises the product of from 1 wt % to 2 wt % of the organic peroxide, based on the weight of the product.

13. The composition of claim 1, wherein the composition comprises the product of from 1 wt % to 1.5 wt % of the organic peroxide, based on the weight of the product.

14. The composition of claim 1, wherein the product has an Mn, by DRI analysis, of from 95,000 g/mole to 120,000 g/mole, an Mw, by MALLS analysis, of from 200,000 g/mole to 300,000 g/mole, and an Mz, by MALLS analysis, of from 290,000 g/mole to 770,000 g/mole.

15. The composition of claim 1, wherein the product has an $Mz_{MALLS}/Mw_{MALLS}$ of from 1 to 4.

16. The composition of claim 1, wherein the product has a $Mz_{MALLS}/Mn_{MALLS}$ of from 1 to 8.

17. A foamed article comprising the composition of claim 1 and a foaming agent, the foamed article comprising the product expanded by the foaming agent.

18. A process to form a composition comprising:
mixing a copolymer with a decomposition product of an organic peroxide, the copolymer comprising at least 50 mol % propylene and at least 1 wt % of at least one of ethylene or a C4 to C10 α-olefin, based on the total weight of the copolymer, the copolymer having an $Mw_{MALLS}/Mn_{MALLS}$ of from 1 to 5 in the form of solid particles, the solid particles are granules having a diameter of from 100 micrometers to 2,000 micrometers, thereby obtaining a homogenized mixture thereof;
melt blending the homogenized mixture; and
obtaining a composition comprising a product comprising the copolymer crosslinked by the organic peroxide, the product having the following:
a peak extensional viscosity (strain rate: 1 sec$^{-1}$ to 10 sec$^{-1}$, 190° C.) of from $1\times10^3$ Pa·s to $1\times10^6$ Pa·s; and
a $Mw_{MALLS}/Mn_{MALLS}$ of from 1.6 to 2.5.

19. The process of claim 18, wherein the mixing occurs in the presence of an inert gas.

20. The process of claim 18, wherein the mixing occurs in a homogenizer at a rate of at least 50,000 lbs of polymer/hour.

21. The process of claim 18, wherein the copolymer has an Mw, by DRI analysis, of from 50,000 g/mole to 400,000 g/mole; an Mn, by DRI analysis, of from 25,000 g/mole to 200,000 g/mole; and an Mz, by DRI analysis, of from 100,000 g/mole to 500,000 g/mole.

* * * * *